(12) United States Patent
Struhsaker

(10) Patent No.: US 7,230,931 B2
(45) Date of Patent: Jun. 12, 2007

(54) WIRELESS ACCESS SYSTEM USING SELECTIVELY ADAPTABLE BEAM FORMING IN TDD FRAMES AND METHOD OF OPERATION

(75) Inventor: Paul F. Struhsaker, Plano, TX (US)

(73) Assignee: Raze Technologies, Inc., Plano, TX (US)

( * ) Notice: Subject to any disclaimer, the term of this patent is extended or adjusted under 35 U.S.C. 154(b) by 1088 days.

(21) Appl. No.: 09/948,059

(22) Filed: Sep. 5, 2001

(65) Prior Publication Data

US 2002/0136170 A1 Sep. 26, 2002

Related U.S. Application Data

(60) Provisional application No. 60/273,757, filed on Mar. 5, 2001, provisional application No. 60/273,689, filed on Mar. 5, 2001, provisional application No. 60/273,579, filed on Mar. 5, 2001, provisional application No. 60/270,378, filed on Feb. 21, 2001, provisional application No. 60/270,385, filed on Feb. 21, 2001, provisional application No. 60/270,430, filed on Feb. 21, 2001, provisional application No. 60/262,708, filed on Jan. 19, 2001, provisional application No. 60/262,955, filed on Jan. 19, 2001, provisional application No. 60/263,097, filed on Jan. 19, 2001, provisional application No. 60/263,101, filed on Jan. 19, 2001, provisional application No. 60/262,824, filed on Jan. 19, 2001, provisional application No. 60/262,951, filed on Jan. 19, 2001, provisional application No. 60/262,826, filed on Jan. 19, 2001, provisional application No. 60/262,827, filed on Jan. 19, 2001, provisional application No. 60/262,698, filed on Jan. 19, 2001, provisional application No. 60/262,825, filed on Jan. 19, 2001, provisional application No. 60/262,712, filed on Jan. 19, 2001.

(51) Int. Cl.
*H04J 3/00* (2006.01)
(52) U.S. Cl. .................................. 370/280; 370/294
(58) Field of Classification Search ................ 370/280, 370/252, 350, 347–348
See application file for complete search history.

(56) References Cited

U.S. PATENT DOCUMENTS

| 6,094,421 A * | 7/2000 | Scott ........................ 370/280 |
| 6,181,955 B1 | 1/2001 | Dartois |
| 6,470,057 B1 * | 10/2002 | Hui et al. .................. 375/294 |

FOREIGN PATENT DOCUMENTS

WO WO 96/37970 11/1996

OTHER PUBLICATIONS

Baum et al. (Performance analysis of an adaptive OFDM packet data system; Broadband Communications, 2000. Proceedings. 2000 International Zurich Seminar on Feb. 15-17, 2000 pp. 237-243).*

(Continued)

*Primary Examiner*—Hassan Kizou
*Assistant Examiner*—Salman Ahmed

(57) ABSTRACT

A transceiver for use in a wireless access network comprising a plurality of base stations, each of the plurality of base stations capable of bidirectional time division duplex (TDD) communication with wireless access devices disposed at a plurality of subscriber premises in a corresponding cell site of the wireless access network. The transceiver is associated with a first base station and comprises transmit path circuitry associated with a beam forming network for transmitting directed scanning beam signals in a sector of a cell site of the first base station. The transmit path circuitry transmits at a start of a TDD frame a broadcast beam signal comprising a start of frame field and subsequently transmits downlink data traffic in a downlink portion of the TDD frame to at least one of the wireless access devices using at least one directed scanning beam.

29 Claims, 14 Drawing Sheets

OTHER PUBLICATIONS

•Wireless in-building network architecture and protocols Buchholz, D.; Odlyzko, P.; Taylor, M.; White, R.; Communications, 1992. ICC 92, Conference record, SUPERCOMM/ICC '92, Discovering a New World of Communications. IEEE International Conference on 14-1.*

•Integrated video and data transmission in the TDD ALOHA-reservation wireless LAN Tasaka, S.; Hayashi, K.; Ishihashi, Y.; Communications, 1995. ICC 95 Seattle, Gateway to Globalization, 1995 IEEE International Conference on vol. 3, Jun. 18-22, 1995 Page.*

Benyamin-Seeyar, Anader, et al; "Draft Document for SC-FDE Phy Layer System for Sub 11 GHz BWA"; XP-002224912; IEEE 802.16.3c01-58r2; IEEE 802.16 Broadband Wireless Access Working Group, 'Online!; May 17, 2001; pp. 0-87.

Leiba, Yigal, et al.; "MAC and PHY Support for AAS"; XP-002224913; IEEE C802.16a-02/49; IEEE 802.16 Broadband Wireless Access Working Group, 'Oneline!; May 10, 2002, pp. 1-10.

* cited by examiner

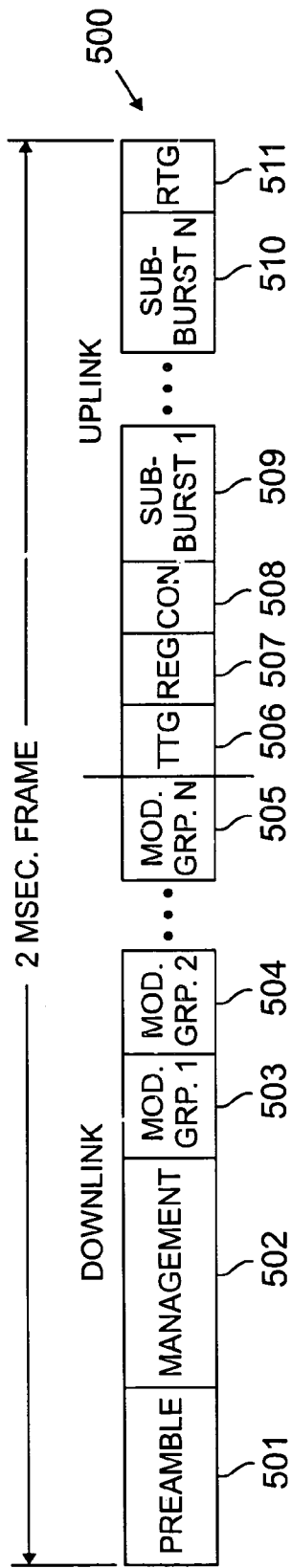
FIG. 5A
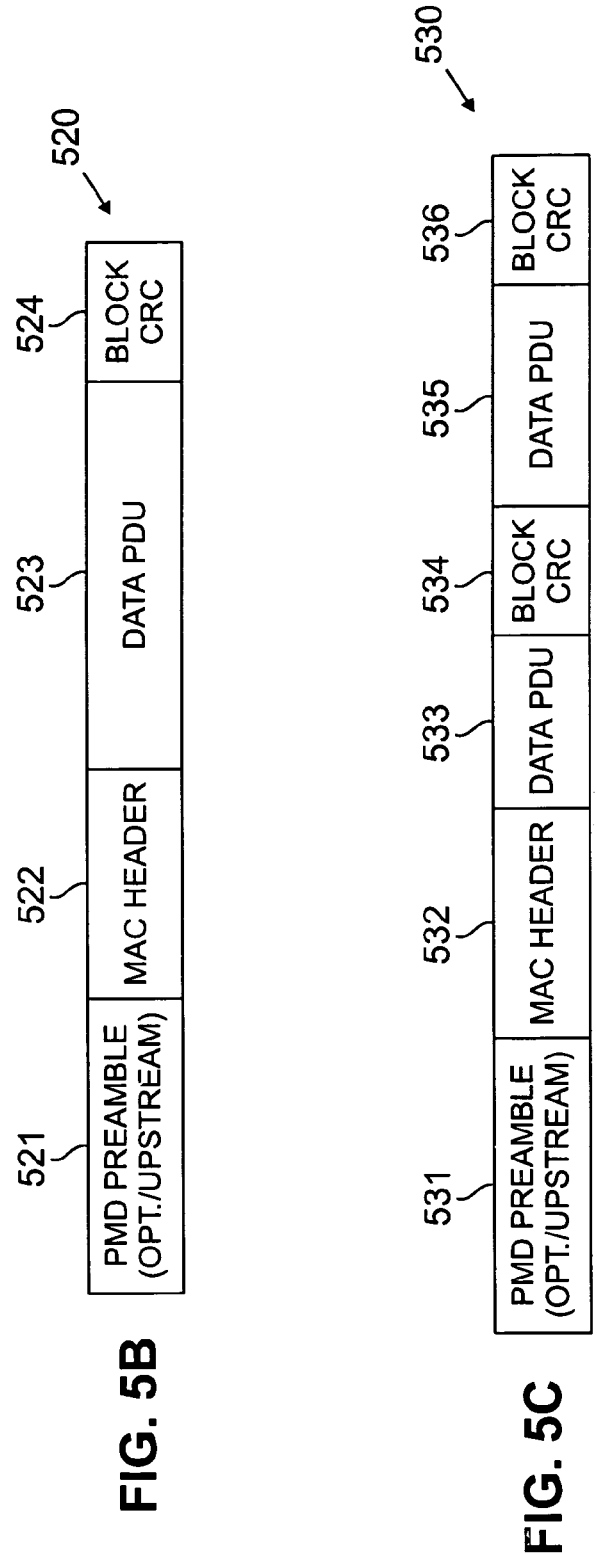
FIG. 5B
FIG. 5C

WIRELESS ACCESS SYSTEM USING SELECTIVELY ADAPTABLE BEAM FORMING IN TDD FRAMES AND METHOD OF OPERATION

CROSS-REFERENCE TO RELATED APPLICATIONS

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS AND METHOD FOR OPERATING A SUBSCRIBER INTERFACE IN A FIXED WIRELESS SYSTEM";
5) Ser. No. 09/839,719, filed Apr. 20, 2001, entitled "APPARATUS AND METHOD FOR CREATING SIGNAL AND PROFILES AT A RECEIVING STATION";
6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
7) Ser. No. 09/839,509, filed Apr. 20, 2001, entitled "BACKPLANE ARCHITECTURE FOR USE IN WIRELESS AND WIRELINE ACCESS SYSTEMS";
8) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
9) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
10) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
11) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
12) Ser. No. 09/839,075, filed Apr. 20, 2001, entitled "TDD FDD AIR INTERFACE";
13) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
14) Ser. No. 09/839,458, filed Apr. 20, 2001, entitled "WIRELESS ACCESS SYSTEM USING MULTIPLE MODULATION";
15) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
16) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";
17) Ser. No. 09/839,858, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
18) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
19) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
20) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
21) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
22) Ser. No. 60/262,698, filed on Jan. 19, 2001, entitled "APPARATUS AND METHOD FOR OPERATING A SUBSCRIBER INTERFACE IN A FIXED WIRELESS SYSTEM";
23) Ser. No. 60/262,827, filed on Jan. 19, 2001, entitled "APPARATUS AND METHOD FOR CREATING SIGNAL AND PROFILES AT A RECEIVING STATION";
24) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
25) Ser. No. 60/262,951, filed on Jan. 19, 2001, entitled "BACKPLANE ARCHITECTURE FOR USE IN WIRELESS AND WIRELINE ACCESS SYSTEMS";
26) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
27) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
28) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
29) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
30) Ser. No. 60/262,955, filed Jan. 19, 2001, entitled "TDD FDD AIR INTERFACE";
31) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";

32) Ser. No. 60/273,689, filed Mar. 5, 2001, entitled "WIRELESS ACCESS SYSTEM USING MULTIPLE MODULATION";
33) Ser. No. 60/273,757, filed Mar. 5, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
34) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";
35) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and 36) Ser. No. 60/270,430, filed February 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless access systems and, more specifically, to a burst packet transmission media access system using selectively adaptable beam forming in a fixed wireless access network.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:
  1) Relatively high bit error rates (BER) compared to wire line or optical systems; and
  2) Transparent operation with network protocols and protocol time constraints for the following protocols:
    a) ATM;
    b) Class 5 switch interfaces (domestic GR-303 and international V5.2);
    c) TCP/IP with quality-of-service QoS for voice over IP (VOIP) (i.e., RTP) and other H.323 media services;
    d) Distribution of synchronization of network time out to the subscribers;
  3) Increased use of voice, video and/or media compression and concentration of active traffic over the air interface to conserve bandwidth;
  4) Switching and routing within the access system to distribute signals from the central office to multiple remote cell sites containing multiple cell sectors and one or more frequencies of operation per sector; and
  5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ (automatic request for retransmission) protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or coverage incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

Media access control (MAC) protocols refer to techniques that increase utilization of two-way communication channel resources by subscribers that use the channel resources. The MAC layer may use a number of possible configurations to allow multiple access. These configurations include:

1. FDMA—frequency division multiple access. In a FDMA system, subscribers use separate frequency channels on a permanent or demand access basis.

2. TDMA—time division multiple access. In a TDMA system, subscribers share a frequency channel but allocate spans of time to different users.

3. CDMA—code division multiple access. In a CDMA system, subscribers share a frequency but use a set of orthogonal codes to allow multiple access.

4. SDMA—space division multiple access—In a SDMA system, subscribers share a frequency but one or more physical channels are formed using antenna beam forming techniques.

5. PDMA—polarization division multiple access—In a PDMA system, subscribers share a frequency but change polarization of the antenna.

Each of these MAC techniques makes use of a fundamental degree of freedom (physical property) of a communications channel. In practice, combinations of these degrees of freedom are often used. As an example, cellular systems use a combination of FDMA and either TDMA or CDMA to support a number of users in a cell.

To provide a subscriber with bi-directional (two-way) communication in a shared media, such as a coaxial cable, a multi-mode fiber (optical), or an RF radio channel, some type of duplexing technique must be implemented. Duplexing techniques include frequency division duplexing (FDD) and time division duplexing (TDD). In FDD, a first channel (frequency) is used for transmission and a second channel (frequency) is used for reception. To avoid physical interference between the transmit and receive channels, the frequencies must have a separation know as the duplex spacing. In TDD, a single channel is used for transmission and reception and specific periods of time (i.e., slots) are allocated for transmission and other specific periods of time are allocated for reception.

Finally, a method of coordinating the use of bandwidth must be established. There are two fundamental methods: distributed control and centralized control. In distributed control, subscribers have a shared capability with or without a method to establish priority. An example of this is CSMA (carrier sense multiple access) used in IEEE802.3 Ethernet and IEEE 802.11 Wireless LAN. In centralized control, subscribers are allowed access under the control of a master controller. Cellular systems, such as IS-95, IS-136, and GSM, are typical examples. Access is granted using forms of polling and reservation (based on polled or demand access contention).

A number of references and overviews of demand access are available including the following:

1. Sklar, Bernard. "Digital Communications Fundamentals and Applications," Prentice Hall, Englewood Cliffs, N.J., 1988. Chapter 9.
2. Rappaport, Theodore. "Wireless Communications, Principles and Practice," Prentice Hall, Upper Saddle River, N.J., 1996. Chapter 8.
3. TR101-173V1.1. "Broadband Radio Access Networks, Inventory of Broadband Radio Technologies and Techniques," ETSI, 1998. Chapter 7.

The foregoing references are hereby incorporated by reference into the present disclosure as if fully set forth herein.

In 1971, the University of Hawaii began operation of a random access shared channel ALOHA TDD system. The lack of channel coordination resulted in poor utilization of the channel. This lead to the introduction of time slots (slotted Aloha) that set a level of coordination between the subscribers that doubled the channel throughput. Finally, the researchers introduced the concept of a central controller and the use of reservations (reservation Aloha). Reservation techniques made it possible to make trade-offs between throughput and latency.

This work was fundamental to the development of media access control (MAC) techniques for dynamic random access and the use of ARQ (automatic request for retransmission) to retransmit erroneous packets. While the work at the University of Hawaii explored the fundamentals of burst transmission and random access, the work did not introduce the concept of a frame and/or super-frame structure to the TDD/TDMA access techniques. One of the more sophisticated systems developed in the 1970s and in current use is Joint Tactical Information Distribution System (JTIDS). This system was based on the joint use of TDMA and time duplexing over frequency-hopping spread-spectrum channels. This was the culmination of research to allow flexible allocation of bandwidth to a large group of users. The key aspect of the JTIDS system was the introduction of dynamic allocation of bandwidth resources and explicit variable symmetry (downlink vs. uplink bandwidth) in the link.

IEEE 802.11 Wireless LAN equipment provides for a centrally coordinated TDD system that does not have a specific frame or slotting structure. IEEE 802.11 did introduce the concept of variable modulation and spreading inherent in the structure of the transmission bursts. A significant improvement was incorporated in U.S. Pat. No. 6,052,408, entitled "Cellular Communications System with Dynamically Modified Data Transmission Parameters." This patent introduced specific burst packet transmission formats that provide for adaptive modulation, transmit power, and antenna beam forming and an associated method of determining the highest data rate for a defined error rate floor for the link between the base station and a plurality of subscribers assigned to that base station. With the exception of variable spreading military systems and NASA space communication systems, this was one of the first commercial patents that address variable transmission parameters to increase system throughput.

Another example of TDD systems are digital cordless phones, also referred to as low-tier PCS systems. The Personal Access Communications (PAC) system and Digital European Cordless Telephone (DECT, as specified by ETSI document EN 300-175-3) are two examples of these systems. Digital cordless phones met with limited success for their intended use as pico-cellular fixed access products. The systems were subsequently modified and repackaged for wireless local loop (WLL) applications with extended range using increased transmission (TX) power and greater antenna gain.

These TDD/TDMA systems use fixed symmetry and bandwidth between the uplink and the downlink. The TDD frame consists of a fixed set of time slots for the uplink and the downlink. The modulation index (or type) and the forward error correction (FEC) format for all data transmissions are fixed in these systems. These systems did not include methods for coordinating TDD bursts between systems. This resulted in inefficient use of spectrum in the frequency planning of cells.

While DECT and PAC systems based on fixed frames with fixed and symmetric allocation of time slots (or bandwidth) provides excellent latency and low jitter, and can support time bounded services, such as voice and Nx64 Kbps video, these systems do not provide efficient use of the spectrum when asymmetric data services are used. This has lead to research and development of packet based TDD systems based on Internet protocol (IP) or asynchronous transfer mode (ATM), with dynamic allocation of TDD time slots and the uplink-downlink bandwidth, combined with efficient algorithms to address both best efforts and real-time low-latency service for converged media access (data and multi-media).

One example of a TDD system with dynamic slot and bandwidth assignment is the ETSI HYPERLAN II specification based on the Dynamic Slot Assignment algorithm described in "Wireless ATM: Performance Evaluation of a DSA++ MAC Protocol with Fast Collision resolution by Probing Algorithm," D. Petras and A. Kramling, International Journal of Wireless Information Networks, Vol. 4, No. 4, 1997. This system allows both contention-based and contention-free access to the physical TDD channel slots. This system also introduced the broadcast of resource allocation at the start of every frame by the base station controller. Other wireless standards, including IEEE 802.16 wireless metropolitan network standards, use this combination of an allocation map of the uplink and downlink at the start of the dynamic TDD frame to set resource use for the next TDD frame.

An further improvement to this TDD system was described in "Multiple Access Control Protocols for Wireless ATM: Problem Definition and Design Objectives," O. Kubbar and H. Mouftah, IEEE Communications, November 1997, pp. 93-99. This system expanded on the packet reservation multiple access (PRMA) method developed in 1989 at Rutgers University WINLAB for ATM and IP based transport [see "Packet Reservation Multiple Access for Local Wireless Communications," Goodman et al., IEEE Transaction on Communications, Vol. 37, No. 8, pp. 885-890]. Like PRMA, this system logically arranged all the downlink transmissions in the start of a fixed duration TDD frame and all uplink transmissions at the end of the TDD frame. This eliminated the inefficiencies in the DCA++ Hyperlan II protocol. Adaptive allocation of uplink and downlink bandwidth is supported. The system provided for fixed, random, and demand assignment mechanisms. Priority is given to quality of service (QoS) applications with resources being removed from best efforts demand access users as required.

The above-described prior art concern the allocation of services in an individual sector of a cell. A cell may consist of M sectors, wherein each sector generally covers a 360/M degree arc around the cell site. Each sector serves Nm subscribers, where m=1 to M. These references did not expressly provide protocol mechanisms or rules for the operation of a given system.

U.S. Pat. No. 6,016,311 expressly addresses one possible implementation to the TDD bandwidth allocation problem. The system described continuously measures and adapts the bandwidth requirements based on the evaluation of the average bandwidth required by all the subscribers in a cell and the number of times bandwidth is denied to the subscribers. Changes to the bandwidth allocation are applied based on a set of rules described in U.S. Pat. No. 6,016,311. While measurements of multiple sectors are performed and recorded at a central base station controller, no global coordination of bandwidth allocation of multiple sectors in a cell or across multiple cells is provided.

Thus, the prior art does not address two very important factors in allocation of bandwidth. First, bandwidth allocation must contemplate stringent bandwidth availability requirements for specific groups of services based on planning of the network. For example, consider life-line toll quality voice service. Toll quality voice requires that a system guarantee a specific maximum blocking probability for all voice users based on peak busy hour call usage. A description of voice traffic planning is provided in "Digital Telephony—$2^{nd}$ Edition," by J. Bellamy, John Wiley and Sons, New York, New York, 1990. If a TDD system is designed to meet life-line voice requirements, the allocation protocol must be able to rapidly (i.e., less than 100 msec) reallocate bandwidth resources up to the capacity necessary to meet the call blocking requirements. Another service group example is a guaranteed service level agreements (SLA). Again, bandwidth must be rapidly restored to meet the SLA conditions. More generally, one may consider G possible service groups having a set of weighted priority level and associated minimum and maximum levels. The weighted priority levels and minimum and maximum levels may be used to bound the bandwidth dynamics of the TDD bandwidth allocation. Minimum levels set a floor for bandwidth allocation and maximum levels set a ceiling. Then averaging can be applied.

Second, the TDD bandwidth allocation must consider adjacent and co-channel interference from both modems and sectors within a cell and between cells. Cell planning tools can be used to establish the relationships for interference. For systems that operate below 10 GHz, antennas and antenna placement at a cell site will not provide adequate signal isolation. These co-channel interference issues are well documented in "Frequency Reuse and System Deployment in Local Multipoint Distribution Service," by V. Roman, IEEE Personal Communications, December 1999, pp. 20 to 27.

Therefore, there is a need in the art for a fixed wireless access network that maximizes spectral efficiency between the base stations of the fixed wireless access network and the subscriber access devices located at the subscriber premises. In particular, there is a need for a fixed wireless access network that implements an air interface that minimized uplink and downlink interference between different sectors within the same base station cell site. There also is a need for a fixed wireless access network that implements an air interface that minimizes uplink and downlink interference between different cell sites within the fixed wireless access network.

SUMMARY OF THE INVENTION

To address the above-discussed deficiencies of the prior art, it is a primary object of the present invention to provide a transceiver for use in a wireless access network comprising a plurality of base stations, each of the plurality of base stations capable of bidirectional time division duplex (TDD) communication with wireless access devices disposed at a plurality of subscriber premises in a corresponding cell site of the wireless access network. According to an advantageous embodiment of the present invention, the transceiver is associated with a first of the plurality of base stations and comprises transmit path circuitry associated with a beam forming network capable of transmitting directed scanning beam signals in a sector of a cell site associated with the first base station. The transmit path circuitry transmits at a start of a TDD frame a broadcast beam signal comprising a start of frame field and subsequently transmits downlink data traffic in a downlink portion of the TDD frame to at least one of the wireless access devices using at least one directed scanning beam.

According to one embodiment of the present invention, the broadcast beam signal further comprises a first beam map containing scanning beam information usable by the at least one wireless access device to detect the least one directed scanning beam.

According to another embodiment of the present invention, the scanning beam information identifies a downlink time slot in the downlink portion during which the at least one directed scanning beam transmits the downlink data traffic.

According to still another embodiment of the present invention, the scanning beam information identifies at least one modulation format associated with the at least one directed scanning beam.

According to yet another embodiment of the present invention, the scanning beam information identifies at least one forward error correction code level associated with the at least one directed scanning beam.

According to a further embodiment of the present invention, the transceiver further comprising receive path circuitry associated with the beam forming network capable of receiving uplink data traffic transmitted by the at least one wireless access device in an uplink portion of the TDD frame.

According to a still further embodiment of the present invention, the first beam map further contains uplink transmission information identifying an uplink time slot in the uplink portion during which the at least one wireless access device transmits the uplink data traffic.

According to a yet further embodiment of the present invention, the uplink transmission information further identifies at least one modulation format used by the at least one wireless access device to transmit the uplink data traffic.

According to still another embodiment of the present invention, the uplink transmission information further identifies at least one at least one forward error correction code level used by the at least one wireless access device to transmit the uplink data traffic.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 5A illustrates an exemplary time division duplex (TDD) frames according to one embodiment of the present invention;

FIG. 5B illustrates an exemplary transmission burst containing a single FEC block according to one embodiment of the present invention;

FIG. 5C illustrates an exemplary transmission burst containing multiple FEC blocks according to one embodiment of the present invention;

DETAILED DESCRIPTION OF THE INVENTION

FIGS. 1 through 14, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless access system.

Figure 1:
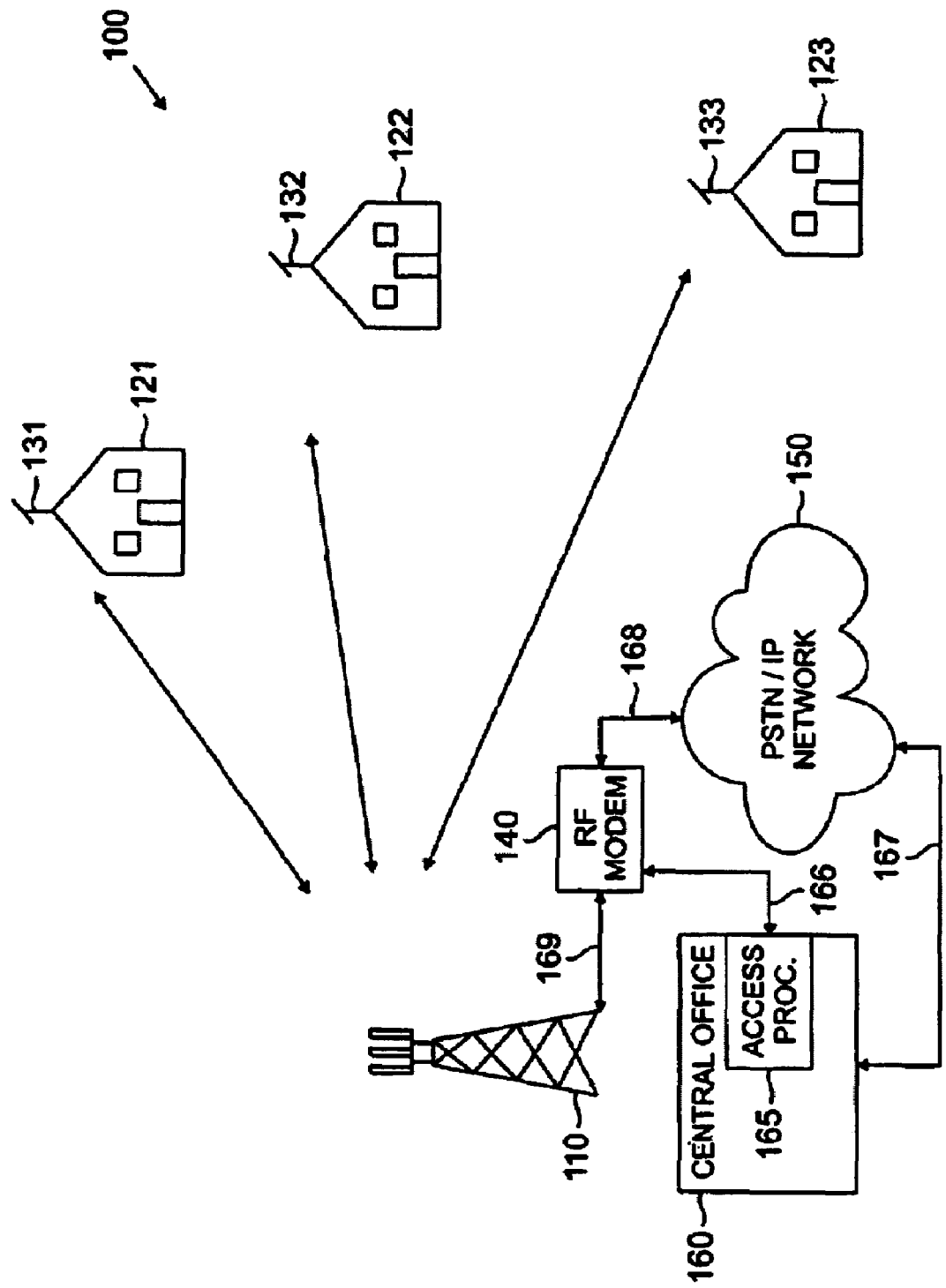
FIG. 1 illustrates an exemplary fixed wireless access network according to one embodiment of the present invention.

FIG. 1 illustrates exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121-123 transmit and receive via fixed, externally-mounted antennas 131-133, respectively. Subscriber premises 121-123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem shelf 140, which, among other things, up-converts baseband data traffic received from external network 150 to RF signals transmitted in the forward channel to subscriber premises 121-123. RF modem shelf 140 also down-converts RF signals received in the reverse channel from subscriber premises 121-123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF modem shelf 140 is located proximate transceiver base station 110 in order to minimize RF losses in communication line 169. RF modem shelf 140 may receive the baseband data traffic from external network 150 and transmit the baseband data traffic to external network 150 via a number of different paths. In one embodiment of the present invention, RF modem shelf 140 may transmit baseband data traffic to, and receive baseband data traffic from, external network 150 through central office facility 160 via communication lines 166 and 167. In such an embodiment, communication line 167 may be a link in a publicly owned or privately owned backhaul network. In another embodiment of the present invention, RF modem shelf 140 may transmit baseband data traffic to, and receive baseband data traffic from, external network 150 directly via communication line 168 thereby bypassing central office facility 160.

Central office facility 160 comprises access processor shelf 165. Access processor shelf 165 provides a termination of data traffic for one or more RF modem shelves, such as RF modem shelf 140. Access processor shelf 165 also provides termination to the network switched circuit interfaces and/or data packet interfaces of external network 150.

One of the principal functions of access processor shelf 165 is to concentrate data traffic as the data traffic is received from external network 150 and is transferred to RF modem shelf 140. Access processor shelf 165 provides data and traffic processing of the physical layer interfaces, protocol conversion, protocol management, and programmable voice and data compression.

Figure 2:
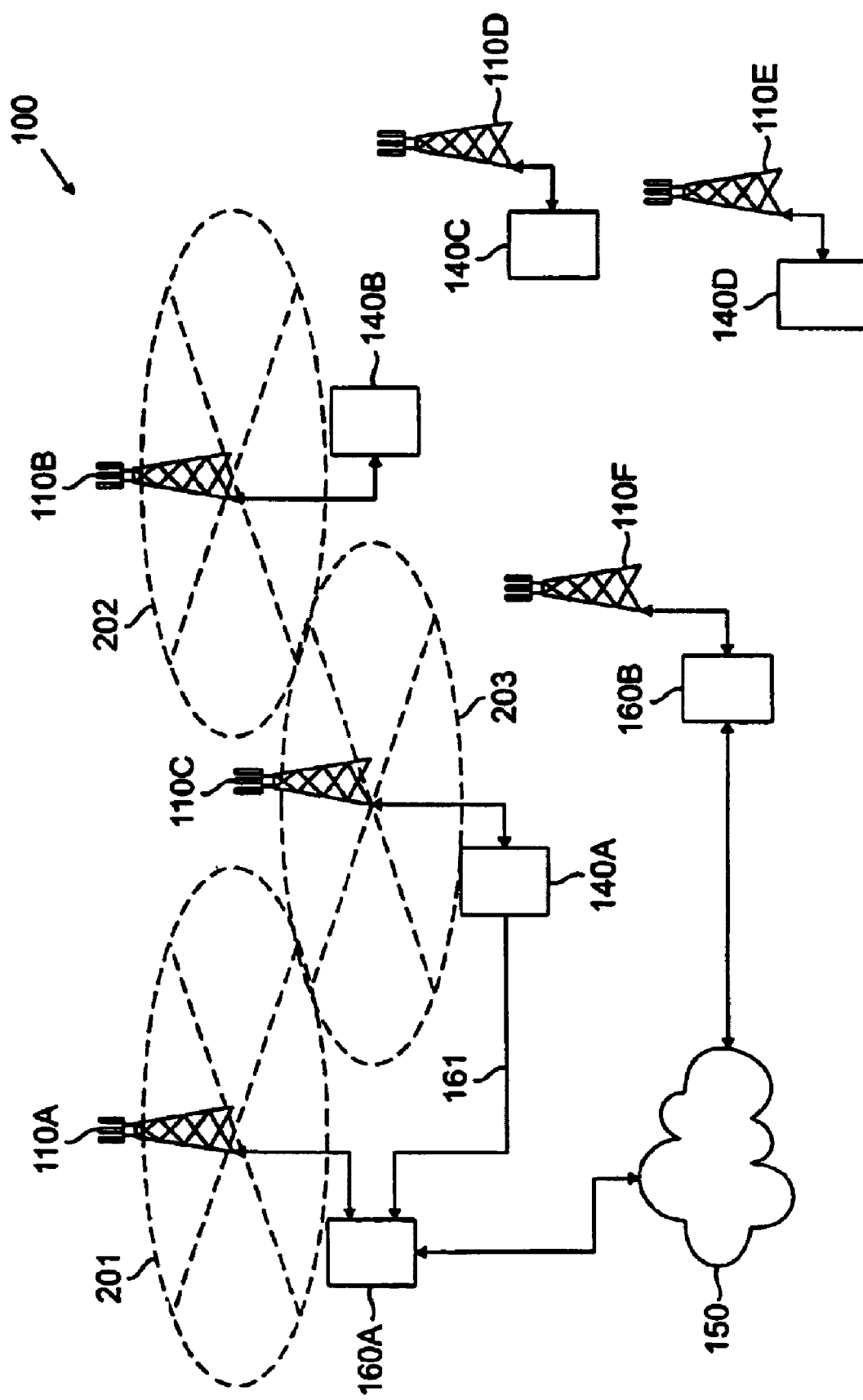
FIG. 2 illustrates in greater detail an alternate view of selected portions of the exemplary fixed wireless access network according to one embodiment of the present invention.

FIG. 2 illustrates in greater detail an alternate view of selected portions of exemplary fixed wireless access network 100 according to one embodiment of the present invention. FIG. 2 depicts additional transceiver base stations, including exemplary transceiver base stations 110A through 110F, central office facilities 160A and 160B, and remote RF modem shelves 140A through 140D. Central office facilities 160A and 160B comprise internal RF modems similar to RF modem shelves 140A through 140D. Transceiver base stations 110A, 110B, and 110C are disposed in cells sites 201, 202, and 203, respectively. In the exemplary embodiment, cell sites 201-203 (shown in dotted lines) are partitioned into four sectors each. In alternate embodiments, sites 201, 202, and 203 may be partitioned into a different number of sectors, such as six sectors, for example.

As in FIG. 1, RF modem shelves 140A-140D and the internal RF modems of central office facilities 160A and 160B transmit baseband data traffic to, and receive baseband data traffic from, access processors in central office facilities 160A and 160B of the PSTN. RF modem shelves 140A-140D and the internal RF modems of central office facilities 160A and 160B also up-convert incoming baseband data traffic to RF signals transmitted in the forward (downlink) channel to the subscriber premises and down-convert incoming RF signals received in the reverse (uplink) channel to baseband data traffic that is transmitted via a backhaul network to external network 150.

Baseband data traffic may be transmitted from remote RF modem shelves 140A-140D to central office facilities 160A and 160B by a wireless backhaul network or by a wireline backhaul network, or both. As shown in FIG. 2, baseband data traffic is carried between central office facility 160A and remote RF modem 140A by a wireline backhaul network, namely wireline 161, which may be, for example, a DS3 line or one to N T1 lines. A local multipoint distribution service (LMDS) wireless backhaul network carries baseband data traffic between central office facilities 160A and 160B and remote RF modem shelves 140B, 140C, and 140D. In a LMDS wireless backhaul network, baseband data traffic being sent to remote RF modem shelves 140B, 140C, and 140D is transmitted by microwave from microwave antennas mounted on transceiver base stations 110A, 110C, and 110F to microwave antennas mounted on transceiver base stations 110B, 110D, and 110E. Baseband data traffic being sent from remote RF modem shelves 140B, 140C, and 140D is transmitted by microwave in the reverse direction (i.e., from transceiver base stations 110B, 110D, and 110E to transceiver base stations 110A, 110C, and 110F).

At each of transceiver base stations 110B, 110D, and 110E, downlink data traffic from central office facilities 160A and 160B is down-converted from microwave frequencies to baseband signals before being up-converted again for transmission to subscriber premises within each cell site. Uplink data traffic received from the subscriber premises is down-converted to baseband signals before being up-converted to microwave frequencies for transmission back to central office facilities 160A and 160B.

Generally, there is an asymmetry of data usage in the downlink and the uplink. This asymmetry is typically greater than 4:1 (downlink:uplink). Taking into account the factors of data asymmetry, channel propagation, and available spectrum, an advantageous embodiment of the present invention adopts a flexible approach in which the physical (PHY) layer and the media access (MAC) layer are based on the use of time division duplex (TDD) time division multiple access (TDMA). TDD operations share a single RF channel between a transceiver base station and a subscriber premises and use a series of frames to allocate resources between each user uplink and downlink. A great advantage of TDD operation is the ability to dynamically allocate the portions of a frame allocated between the downlink and the uplink. This results in an increased efficiency of operation relative to frequency division duplex (FDD) techniques. TDD operations typically may achieve a forty to sixty percent advantage in spectral efficiency over FDD operations under typical conditions. Given the short duration of the transmit and receive time slots relative to changes in the channel, TDD operations also permit open loop power control, switched diversity techniques, and feedforward and cyclo-stationary equalization techniques that reduce system cost and increase system throughput.

Figure 3:
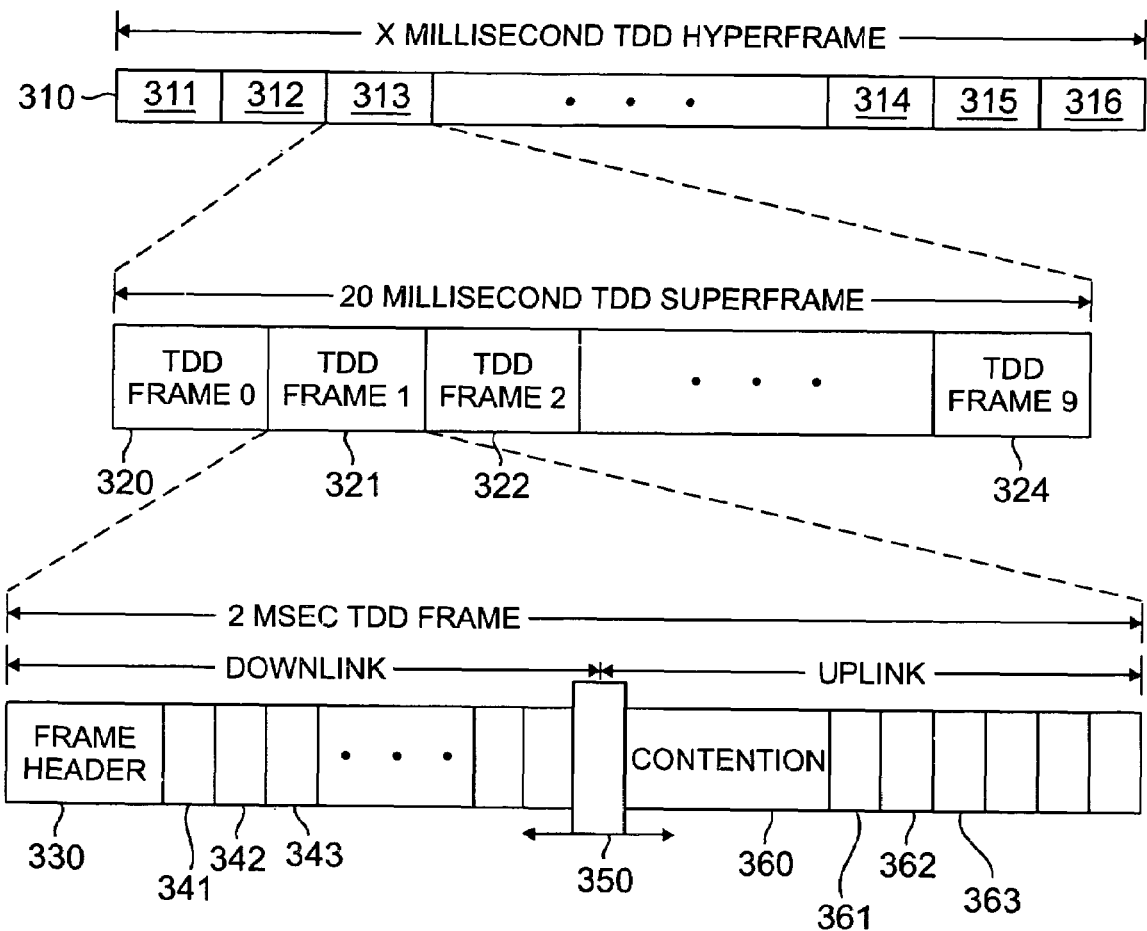
FIG. 3 illustrates an exemplary time division duplex (TDD) time division multiple access (TDMA) frame according to one embodiment of the present invention.

To aid with periodic functions in the system, TDD frames are grouped into superframes (approximately 10 to 20 milliseconds). The superframes are further grouped into hyperframes (approximately 250 to 1000 milliseconds). This provides a coordinated timing reference to subscriber integrated access devices in the system. FIG. 3 illustrates an exemplary time division duplex (TDD) time division multiple access (TDMA) framing hierarchy according to one embodiment of the present invention. At the highest level, the TDD-TDMA framing hierarchy comprises hyperframe 310, which is X milliseconds (msec.) in length (e.g., 250 msec.<X<1000 msec.). Hyperframe 310 comprises N superframes, including exemplary superframes 311-316. Each of superframes 311-316 is 20 milliseconds in duration.

Superframe 313 is illustrated in greater detail. Superframe 313 comprises ten (10) TDD frames, including exemplary TDD frames 321-324, which are labeled TDD Frame 0, TDD Frame 1, TDD Frame 2, and TDD Frame 9, respectively. In the exemplary embodiment, each TDD frame is 2 milliseconds in duration. A TDD transmission frame is based on a fixed period of time during which access to the channel is controlled by the transceiver base station.

Exemplary TDD frame 321 is illustrated in greater detail. TDD frame 321 comprises a downlink portion (i.e, base station to subscriber transmission) and an uplink portion (i.e., subscriber to base station transmission). In particular, TDD frame 321 comprises:

Frame header 330—Frame header 330 is a broadcast message that synchronizes the start of frame and contains access control information on how the remainder of TDD frame 321 is configured. The modulation format of frame header 330 is chosen so that all subscribers in a sector of the transceiver base station can receive frame header 330. Generally, this means that frame header 330 is transmitted in a very low complexity modulation format, such as binary phase shift keying (BPSK or 2-BPSK), or perhaps quadrature phase shift keying (QPSK or 4-BPSK).

D Downlink Slots—The D downlink slots, including exemplary downlink slots 341-343, contain transceiver base station-to-subscriber subscriber transmissions of user traffic and/or control signals. The modulation format of each slot is optimized for maximum possible data transmission rates. Downlink slots may be grouped in blocks to form modulation groups as shown in FIG. 5A. Subscribers who receive data using the same modulation format (or modulation index) and the same forward error correction (FEC) codes are grouped together in the same modulation group. In some embodiment of the present invention, two or more modulation groups may have the same modulation format and FEC codes. In alternate embodiments of the present invention, downlink slots may be grouped in blocks based on physical beam forming, rather than on modulation format and FEC codes. For example, a transceiver base station may transmit data to several subscribers that are directionally along the same antenna beam in consecutive bursts. In still other embodiments of the present invention, downlink slots may be grouped in blocks based on any combination of two or more of: 1) physical beam forming, 2) modulation format, and 3) FEC codes. For the purpose of simplicity, the term "modulation group" shall be used hereafter to refer to a group of downlink slots that are transmitted to one or more subscribers using a common scheme consisting of one or more of modulation format, FEC codes, and physical beam forming.

U Uplink Slots—The U uplink slots, including exemplary uplink slots 361-363, contain subscriber-to-transceiver base station transmissions of user traffic and/or control signals. Again, the modulation format (modulation index) is optimized for maximum possible data transmission rates. Generally, the modulation format and FEC codes in the uplink slots are less complex than in the downlink slots. This moves complexity to the receivers in the base stations and lowers the cost and complexity of the subscriber access device. Uplink slots may be grouped in blocks to form sub-burst groups as shown in FIG. 5A. Subscribers who transmit data using the same modulation format (or modulation index) and the same forward error correction (FEC) codes are grouped together in the same sub-burst group. In some embodiments of the present invention, two or more sub-burst groups may have the same modulation format and FEC codes. In other embodiments of the present invention, uplink slots may be grouped in blocks based on physical beam forming, rather than on modulation format and FEC codes. In other embodiments, uplink slots may be grouped in blocks based on any combination of two or more of: 1) physical beam forming, 2) modulation format, and 3) FEC codes. For the purpose of simplicity, the term "sub-burst group" shall be used hereafter to refer to a group of uplink slots that are transmitted to one or more subscribers using a common scheme consisting of one or more of modulation format, FEC codes, and physical beam forming.

Contention Slots 360—Contention slots 360 precede the U uplink slots and comprise a small number of subscriber-to-base transmissions that handle initial requests for service. A fixed format length and a single modulation format suitable for all subscriber access devices are used during contention slots 360. Generally, this means that contention slots 360 are transmitted in a very low complexity modulation format, such as binary phase shift keying (BPSK or 2-BPSK), or perhaps quadrature phase shift keying (QPSK or 4-BPSK). Collisions (more than one user on a time slot) result in the use of back-off procedures similar to CSMA/CD (Ethernet) in order to reschedule a request.

TDD Transition Period 350—TDD transition period 350 separates the uplink portion and the downlink portion and allows for transmitter (TX) to receiver (RX) propagation delays for the maximum range of the cell link and for delay associated with switching hardware operations from TX to RX or from RX to TX. The position of TDD transition period 350 may be adjusted, thereby modifying the relative sizes of the uplink portion and the downlink portion to accommodate the asymmetry between data traffic in the uplink and the downlink.

A key aspect of the present invention is that the timing of the downlink and uplink portions of each TDD frame must be precisely aligned in order to avoid interference between sectors within the same cell and/or to avoid interference between cells. It is recalled from above that each sector of a cell site is served by an individual RF modem in RF modem shelves 140A-140D and the internal RF modem shelves of central office facilities 160A and 160B. Each RF modem uses an individual antenna to transmit and to receive in its assigned sector. The antennas for different sectors in the same cell site are mounted on the same tower and are located only a few feet apart. If one RF modem (and antenna) are transmitting in the downlink while another RF modem (and antenna) are receiving in the uplink, the power of the downlink transmission will overwhelm the downlink receiver.

Thus, to prevent interference between antennas in different sectors of the same cell site, the present invention uses a highly accurate distributed timing architecture to align the start points of the downlink transmissions. The present invention also determines the length of the longest downlink transmission and ensures that none of the uplink transmissions begin, and none of the base station receivers begin to receive, until after the longest downlink is completed.

Furthermore, the above-described interference between uplink and downlink portions of TDD frames can also occur between different cell sites. To prevent interference between antennas in different cell sites, the present invention also uses the highly accurate distributed timing architecture to align the start points of the downlink transmissions between cell sites. The present invention also determines the length of the longest downlink transmission among two or more cell sites and ensures that none of the base station receivers in any of the cells begins to receive in the uplink until after the longest downlink transmission is completed.

Within a cell site, a master interface control processor (ICP), as described below in FIG. 4, may be used to align and allocate the uplink and downlink portions of the TDD frames for all of the RF modems in an RF modem shelf. Between cell sites, the access processor may communicate with several master ICPs to determine the longest downlink. The access processor may then allocated the uplinks and downlinks across several cell sites in order to minimize interference between cell sites and may designate on master ICP to control the timing of all of the master ICPs.

Figure 4:
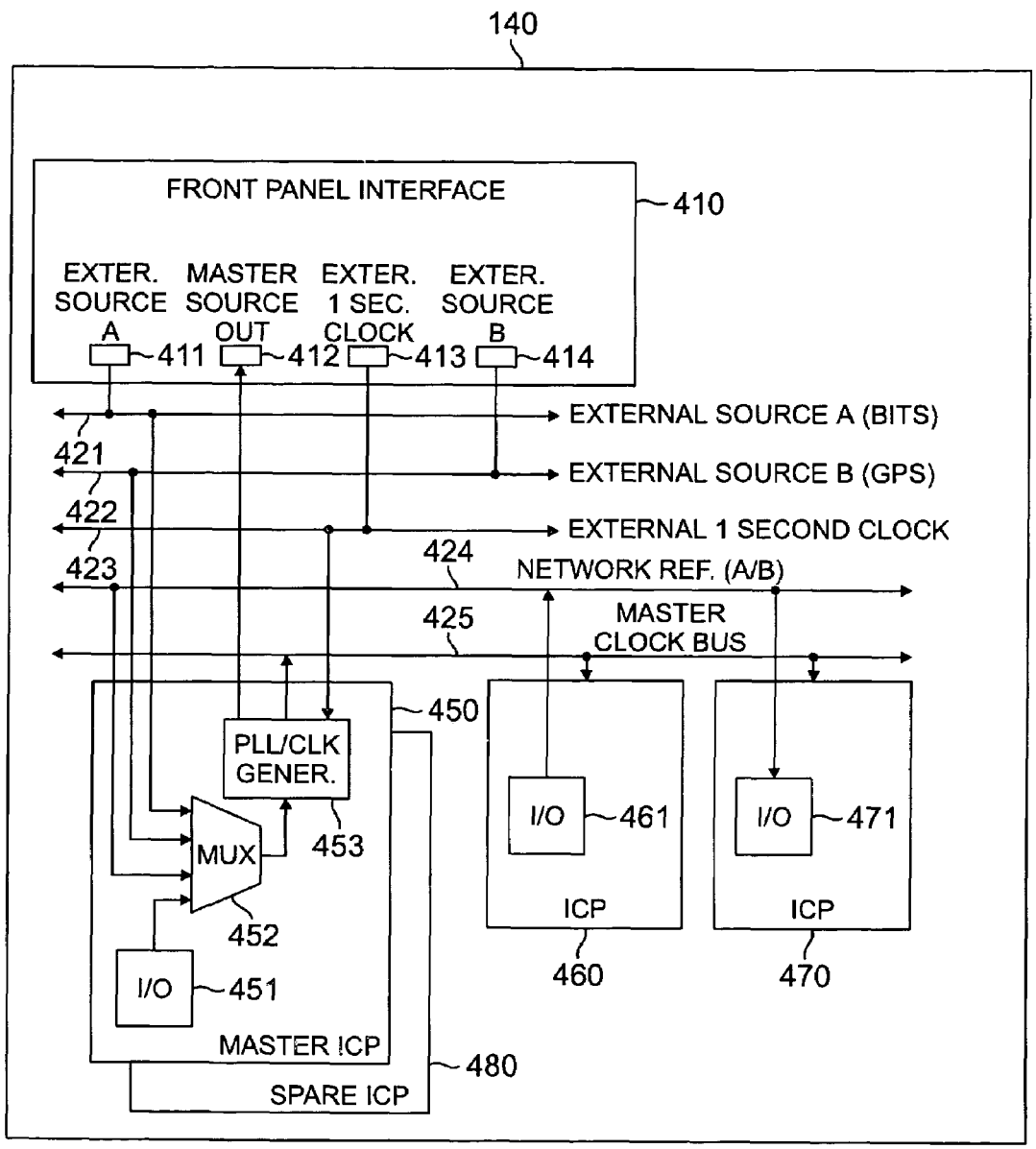
FIG. 4 illustrates the timing recovery and distribution circuitry in an exemplary RF modem shelf according to one embodiment of the present invention.

FIG. 4 illustrates the timing recovery and distribution circuitry in exemplary RF modem shelf 140 according to one embodiment of the present invention. RF modem shelf 140 comprises front panel interface 410 having connectors 411-414 for receiving input clock references and transmitting clock references. Exemplary connector 411 receives a first clock signal from a first external source (External Source A) and exemplary connector 414 receives a second clock signal from a second external source (External Source B). Connector 412 outputs an internally generated clock signal (Master Source Out) and connector 413 receives an external one second system clock signal (External 1 Second Clock).

RF modem shelf 140 also comprises a plurality of interface control processor (ICP) cards, including exemplary ICP cards 450, 460, 470 and 480. ISP card 450 is designated as a master ICP card and ICP card 480 is designated as a spare ICP card in case of a failure of master ICP card 450. Within RF modem shelf 140, the ICP cards provide for control functions, timing recovery and distribution, network interface, backhaul network interface, protocol conversion, resource queue management, and a proxy manager for EMS for the shelf. The ICP cards are based on network processor(s) that allow software upgrade of network interface protocols. The ICP cards may be reused for control and routing functions and provide both timing and critical TDD coordinated burst timing for all the RF modems in RF modem shelf 140 and for shelf-to-shelf timing for stacked frequency high density cell configurations.

The timing and distribution architecture in RF modem shelf 140 allows for three reference options:

Primary—An external input derived from another remote modem shelf acting as a master. BITS (Building Integrated Timing Supply) reference is a single building master timing reference (e.g., External Source A, External Source B) that supplies DS1 and DS0 level timing throughout an office (e.g., 64K or 1.544/2.048 Mbps).

Secondary—A secondary reference may be derived from any designated input port in RF modem shelf 140. For remote RF modem shelf 140, this is one of the backhaul I/O ports. An ICP card is configured to recover a timing source and that source is placed on a backplane as a reference (i.e., Network Reference (A/B)) to master ICP card 450.

Tertiary—An internal phase locked loop (PLL) may be used.

By default, two ICP cards are configured as a master ICP card and a spare ICP card. The active master ICP card distributes timing for all of RF modem shelf 140. The timing distribution architecture of RF modem shelf 140 meets Stratum 3 levels of performance, namely a free-run accuracy of +/−4.6 PPM (parts per million), a pull-in capability of 4.6 PPM, and a holdover stability of less than 255 slips during the first day.

There are three components to the timing distribution for the access processor backplane:

1. Timing masters (ICP cards 450 and 480).
2. Timing slaves (ICP cards 460 and 470).
3. Timing references.

The timing masters are capable of sourcing all clocks and framing signals necessary for the remaining cards within the AP backplane. Within a backplane, there are two timing masters (ICP cards 450 and 480), which are constrained to the slots allocated as the primary and secondary controllers. The timing masters utilize the redundant timing references (External Source A, External Source B, External 1 Second Clock) found on the backplane to maintain network-qualified synchronization. ISP card 450 (and ISP card 480) comprises backhaul network input/output (I/O) port 451, multiplexer 452 and PLL-clock generator 453. MUX 452 selects anyone of External Source A, External Source B, Network Reference (A/B), and the signal from I/O port 451 to be applied to PLL-clock generator 453. The timing master has missing clock detection logic that allows it to switch from one timing reference to another in the event of a failure.

Timing is distributed across a redundant set of clock and framing signals, designated Master Clock Bus in FIG. 4. Each timing master (i.e., ICP cards 450 and 480) is capable under software control of driving either of the two sets of clock and framing buses on the backplane. Both sets of timing buses are edge-synchronous such that timing slaves can interoperate while using either set of clocks.

The timing supplied by the timing master (e.g., ICP card 450) consists of a 65.536 MHZ clock and an 8 KHz framing reference. There is a primary and secondary version of each reference. To generate these references, the primary and secondary timing masters are provisioned to recover the timing from one of the following sources:

| Source | Frequency |
| --- | --- |
| External BITS (EXT REF A) | 64 K, 1544 K, 2048 K |
| External BITS/GPS (EXT REF B) | 64 K, 1544 K, 2048 K |
| External GPS Sync. Pulse | 1 second pulse |
| On-Card Reference | Per I/O reference |
| Network I/O Derived Reference A | Per I/O reference |
| Network I/O Derived Reference B | Per I/O reference |

Table of Clock Source Interface Definitions

To simplify clock distribution and to provide redundancy all the clocks are derived from a common clock source. The following table summarizes the backplane reference clocks as well as the clock rates of the various backplane resources and how they are derived from these references.

Table of Buses and Associated Clocks

| Clock | Frequency | Division or Ratio |
| --- | --- | --- |
| Common Reference Clock | 65.536 MHZ | Not Applicable |
| Common Sync Pulse | 1 Hz | Not Applicable |
| Framing Reference | 8 KHz (125 usec) | Free-run framing provided by Primary or Secondary Clock Masters Referenced to Common Reference Clock |
| Cell/Packet Clock Rate | 32.768 MHZ | Reference Clock/2 |
| TDM Bus Rate | 8.192 MHZ | Reference Clock/8 |
| RF Reference Clock | 10.000 MHZ | Free-run RE reference clock |
| Communications Bus | 100 MHZ | Derived from free-run Reference Clock |
| High-speed Serial Links | 1.31072 GHz | REF. Clock × 20 |
| High-speed Serial Links | 2.62144 GHz | REF. Clock × 40 |
| High-speed Serial Links | TBD | REF. Clock × N |

Timing slaves (i.e., ICP cards 460 and 470) receive the timing provided by redundant sets of clock and framing buses. Under software control, timing slaves choose a default set of clocks from either the A-side or B-side timing buses. They also contain failure detection logic such that clock and framing signal failures can be detected. Once a clock or framing failure is detected, the timing slave automatically switches to the alternate set of timing buses. ICP cards 460 and 470 contain backhaul I/O ports 461 and 471, respectively, which may be used to bring in external timing signals from other RF modem shelves in the network. The timing masters (i.e., ICP cards 450 and 480) also contain the timing slave function insofar as they also utilize the timing provided on the backplane clock and framing buses.

A qualified timing reference is required for the timing master to derive backplane timing and to maintain synchronization within network 100 and with any outside network. Under software control, an access processor card can be assigned to derive this timing and to drive one of the two timing reference buses. Ideally, a second, physically separate card will contain a second qualified timing source and drive the second backplane timing reference.

In the event that no qualified timing is present from trunk interfaces, the access processor backplane has connections which allow external reference timing (e.g., a GPS-derived clock) from the interface tray to be applied to the backplane. A one pulse-per-second (1PPS) signal is distributed to all system cards for time stamping of system events and errors. Installations involving multiple access processor shelves require the timing reference to be distributed between all access processor backplanes. In this scenario, the timing reference for a given backplane is cabled to the remaining backplanes through external cabling. Multiple remote modem shelves are utilized to distribute high-capacity backhaul traffic to one or more additional co-located modem shelves. Traffic is distributed among the shelves through T1, T3, OC3 and/or other broadband telecommunication circuits. To maintain network timing, the additional shelves are slaved to these distribution links and recover timing through the same PLL mechanisms as the head-end shelf.

FIG. 5A illustrates exemplary time division duplex (TDD) frame 500 according to one embodiment of the present invention. FIG. 5B illustrates exemplary transmission burst 520 containing a single FEC block according to one embodiment of the present invention. FIG. 5C illustrates exemplary transmission burst 530 containing multiple FEC blocks according to one embodiment of the present invention.

TDD frame 500 comprises a downlink portion containing preamble field 501, management field 502, and N modulation groups, including modulation group 503 (labeled Modulation Group 1), modulation group 504 (labeled Modulation Group 2), and modulation group 505 (labeled Modulation Group N). As explained above in FIG. 3, a modulation group is a group of downlink slots transmitted to one or more subscribers using a common scheme of one or more of: 1) modulation format, 2) FEC codes, and 3) physical beam forming.

TDD frame 500 also comprises an uplink portion containing transmitter-transmitter guard (TTG) slot 506, 0 to N registration (REG) minislots 506, 1 to N contention (CON) request minislots 508, N sub-burst groups, including sub-burst group 509 (labeled Sub-Burst 1) and sub-burst group 510 (labeled Sub-Burst N), and receiver-transmitter guard (RTG) slot 511. As explained above in FIG. 3, a sub-burst group is a group of uplink slots transmitted to one or more subscribers using a common scheme of one or more of: 1) modulation format, 2) FEC codes, and 3) physical beam forming.

Each modulation group and each sub-burst group comprises one or more transmission bursts. Exemplary transmission burst 520 may be used within a single modulation group in the downlink and covers one or more downlink slots. Transmission burst 520 also may be used within a single sub-burst group in the downlink and covers one or more uplink slots. Transmission burst 520 comprises physical media dependent (PMD) preamble field 521, MAC header field 522, data packet data unit (PDU) field 523, and block character redundancy check (CRC) field 524. Transmission burst 530 comprises physical media dependent (PMD) preamble field 531, MAC header field 532, data PDU field 533, block CRC field 534, data PDU field 535, block CRC field 536.

The start of every frame includes a Start-Of-Frame (SOF) field and a PHY Media Dependent Convergence (PMD) field. PMD preambles are used to assist in synchronization and time-frequency recovery at the receiver. The SOF field allows subscribers using fixed diversity to test reception conditions of the two diversity antennas.

The SOF PMD field is $2^N$ symbols long (typically 16, 32, 64 symbols long) and consists of pseudo-random noise (PN) code sequences, Frank sequences, CAZAC sequences, or other low cross-correlation sequences, that are transmitted using BPSK or QPSK modulation. The SOF field is followed by downlink management messages broadcast from the base station to all subscribers using the lowest modulation or FEC index and orthogonal expansion. Management messages are transmitted both periodically (N times per hyperframe) and as required to change parameters or allocate parameters. Management messages include:

1. DownLink Map indicating the physical slot (PS) where downstream modulation changes (transmitted every frame);

2. UpLink Map indicating uplink subscriber access grants and associated physical slot start of the grant (transmitted when changed and at a minimum of one second hyperframe periods (shorter periods are optional));

3. TDD frame and physical layer attributes (periodic at a minimum of one second hyperframe period); and 4. Other management messages including ACK, NACK, ARQ requests, and the like (transmitted as required).

The downlink management messages are followed by multi-cast and uni-cast bursts arranged in increasing modulation complexity order. The present invention introduces the term "modulation group" to define a set of downstream bursts with the same modulation and FEC protection. A subscriber continuously receives all the downstream data in the TDD frame downlink until the last symbol of the highest modulation group supported by the link is received. This allows a subscriber maximum time to perform receive demodulation updates.

The downlink-to-uplink transition provides a guard time (TTG) to allow for propagation delays for all the subscribers. The TTG position and duration is fully programmable and set by management physical layer attribute messages. The TTG is followed by a set of allocated contention slots that are subdivided between acquisition uplink ranging mini-slots and demand access request mini-slots. The Uplink Map message establishes the number and location of each type of slot. Ranging slots are used for both initial uplink synchronization of subscribers performing net entry and for periodic update of synchronization of active subscribers. Contention slots provide a demand access request mechanism to establish subscriber service for a single traffic service flow. As collisions are possible, the subscriber uses random back-off, in integer TDD frame periods and retries based on a time out for request of service. Contention slots use the lowest possible modulation, FEC, and orthogonal expansion supported by the base station.

The contention slots are followed by individual subscriber transmissions (sub-bursts) that have been scheduled and allocated by the base station in the uplink Map. Each subscriber transmission burst is performed at the maximum modulation, FEC, and orthogonal expansion supported by the subscriber. Finally, the subscriber transmissions are followed by the uplink-to-downlink transition which provides a guard time (RTG) to allow for propagation delays for all the subscribers. The RTG duration is fully programmable and set by management physical layer attribute messages.

In the downlink, the Physical Media Dependent (PMD) burst synchronization is not used. The transmission burst begins with the MAC header and is followed by the packet data unit (PDU) and the associated block CRC field that protects both the PDU and the header. The PDU may be a complete packet transmission or a fragment of a much larger message. When a channel requires more robust FEC, the PDU may be broken into segments that are protected by separate FEC CRC fields. This avoids wasting bandwidth with additional MAC headers.

One significant difference between the uplink and the downlink is the addition of the PMD preamble. The PMD preamble length and pattern can be programmed by transceiver base station 110. Like the SOF field at the beginning of the TDD Frame, the preamble provides a synchronization method for the base station receiver. Uplink registration and ranging packet bursts use longer PMD preambles.

The medium access control (MAC) layer protocol is connection oriented and provides multiple connections of different quality of service (QoS) to each subscriber. The connections are established when a subscriber is installed and enters operation fixed wireless access network 100. Additional connections can be established and terminated with the base station transceivers as subscriber requirements changes.

As an example, suppose a subscriber access device supports two voice channels and a data channel. The quality of service (QoS) on both of the voice channels and data can set based on the service structure set by the wireless service provider. At installation, a subscriber may start with two service connections: a toll quality voice channel and a medium data rate broadband data connection. At a later point in time, the subscriber may order and upgrade service to two toll quality voice channels and high speed data connection (a total of three connections).

The maintenance of connections varies based on the type of connection established. T1 or fractional T1 service requires almost no maintenance due to the periodic nature of transmissions. A TCP/IP connection often experiences bursty on-demand communication that may be idle for long periods of time. During those idle periods, periodic ranging and synchronization of the subscriber is required.

In an exemplary embodiment of fixed wireless access network 100, each subscriber maintains a 64-bit EUI for globally unique addressing purposes. This address uniquely defines the subscriber from within the set of all possible vendors and equipment types. This address is used during the registration process to establish the appropriate connections for a subscriber. It is also used as part of the authentication process by which the transceiver base station and the subscriber each verify the identity of the other.

In the exemplary embodiment, a connection may be identified by a 16-bit connection identifier (CID) in MAC header 522 or MAC header 532. Every subscriber must establish at least two connections in each direction (upstream and downstream) to enable communication with the base station. The basic CIDs, assigned to a subscriber at registration, are used by the base station MAC layer and the subscriber MAC layer to exchange MAC control messages, provisioning and management information.

The connection ID can be considered a connection identifier even for nominally connectionless traffic like IP, since it serves as a pointer to destination and context information. The use of a 16-bit CID permits a total of 64K connections within the sector.

In an exemplary embodiment of fixed wireless access network 100, the CID may be divided into 2 fields. Bits [16:x] may be used to uniquely identify a subscriber. In a cyclo-stationary receiver processing at a base station, this would set the antenna, equalizer, and other receiver parameters. Bits [x:1] may be used to indicate a connection to a type of service. Each subscriber service can have individual modulation format, FEC, and ARQ. Thus, within a single sub-burst group transmitted by a subscriber, the voice data may use one type of modulation format, FEC, and ARQ, and the broadband internet service may use a different modulation format, FEC, and ARQ. Similarly, within a single modulation group transmitted to the subscriber, the voice data may use one type of modulation format, FEC, and ARQ, and the broadband internet service may use a different modulation format, FEC, and ARQ.

As an example, bits [16:7] of the CID may identify $2^{10}$ (or 1024) distinct subscribers and bits [6:1] may identify $2^6=64$ possible connections. An apartment building could be given a set of subscriber ports [16:9] so that bits [9:7] allow $2^8$ connections or 256 connections.

Requests for transmission are based on these connection IDs, since the allowable bandwidth may differ for different connections, even within the same service type. For example, a subscriber unit serving multiple tenants in an office building would make requests on behalf of all of them, though the contractual service limits and other connection parameters may be different for each of them.

Many higher-layer sessions may operate over the same wireless connection ID. For example, many users within a company may be communicating with TCP/IP to different destinations, but since they all operate within the same overall service parameters, all of their traffic is pooled for request/grant purposes. Since the original LAN source and destination addresses are encapsulated in the payload portion of the transmission, there is no problem in identifying different user sessions.

Fragmentation is the process by which a portion of a subscriber payload (uplink or downlink) is divided into two or more PDUs. Fragmentation allows efficient use of available bandwidth while maintaining the QoS requirements of one or more of services used by the subscriber. Fragmentation may be initiated by a base station for a downlink connection or the subscriber access device for the uplink connection. A connection may be in only one fragmentation state at any given time. The authority to fragment data traffic on a connection is defined when the connection is created.

The MAC layer protocol in wireless access network 100 also supports concatenation of multiple PDUs in a single transmission in both the uplink and the downlink, as shown in FIG. 5C. Since each PDU contains a MAC header with the CID, the receiving MAC layer can determine routing and processing by higher layer protocols. A base station MAC layer creates concatenated PDUs in the uplink Map. Management, traffic data, and bandwidth may all be concatenated. This process occurs naturally in the downlink. In the uplink, concatenation has the added benefit of eliminating additional PMD preambles.

Figure 6:
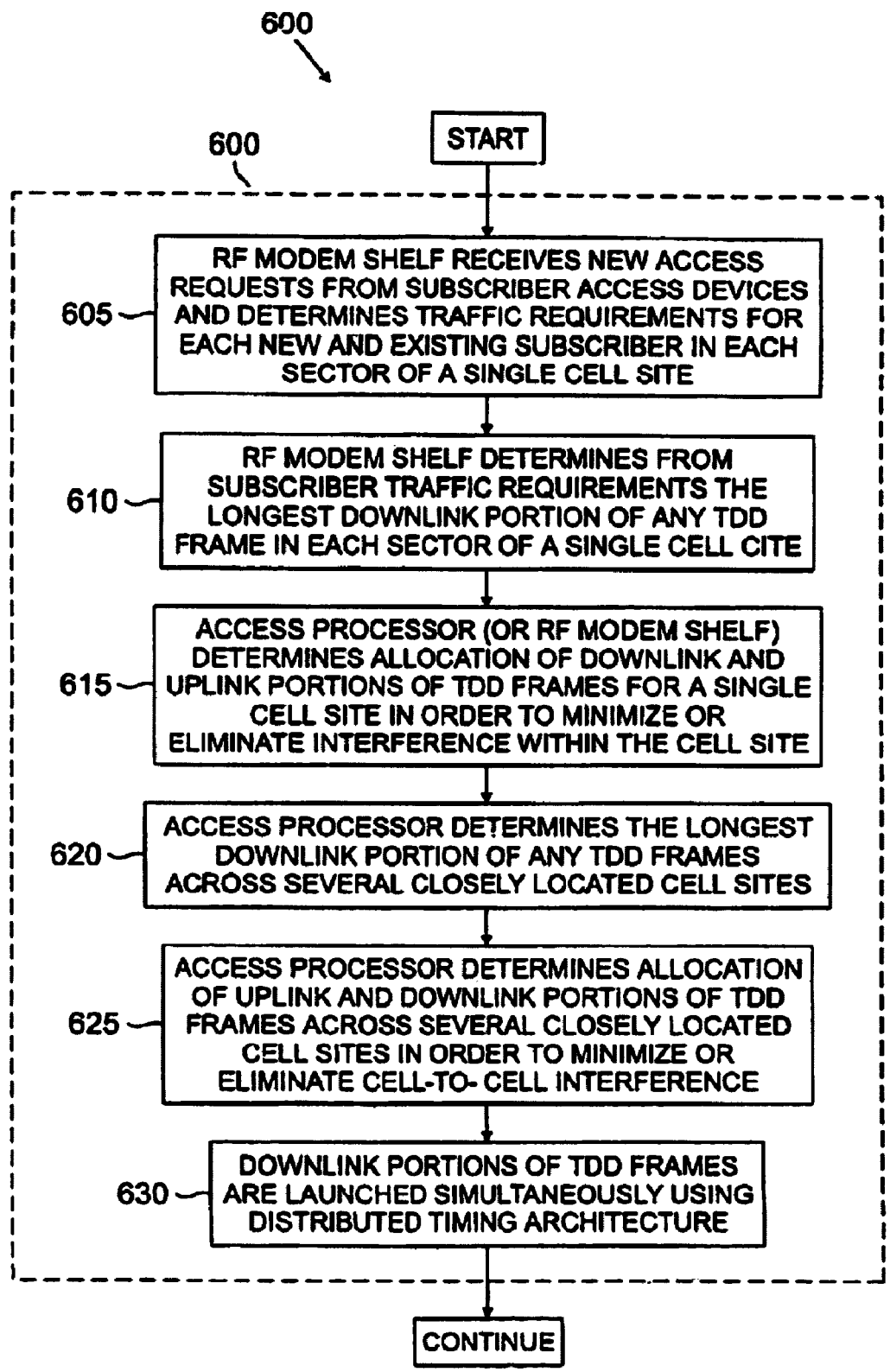
FIG. 6 is a flow diagram illustrating the adaptive modification of the uplink and downlink bandwidth in the air interface in wireless access network according to one embodiment of the present invention.

FIG. 6 depicts flow diagram 600, which illustrates the adaptive modification of the uplink and downlink bandwidth in the air interface in wireless access network 100 according to one embodiment of the present invention. Initially, an RF modem shelf, such as RF modem shelf 140A, receives new access requests from subscriber access devices in fixed wireless access network 100 and determines traffic requirements for each new and existing subscriber in each sector of a single cell site (process step 605). The traffic requirements of each subscriber may be established in a number of ways, including minimum QoS requirements, service level agreements, past usage, and current physical layer parameters, such as modulation index, FEC codes, antenna beam forming, and the like. The RF modem shelf then determines from the subscriber traffic requirements the longest downlink portion of any TDD frame in each sector of a single cell site (process step 610).

Next, the access processor for the RF modem shelf (or the RF modem shelf itself) determines the appropriate allocation of downlink and uplink portions of TDD frames for a single cell site in order to minimize or eliminate interference within the cell site (process step 615). Bandwidth is allocated, and TDD transition period 350 is positioned, such that the longest downlink transmission is complete before any receiver in the cell site starts to listen for the uplink transmission.

Next, if global allocation of downlink and uplink bandwidth across multiple cell sites is being implemented (generally the case), the access processor determines the longest downlink portion of any TDD frame across several closely located cell sites stations (process step 620). The access processor then determines the allocation of uplink and downlink bandwidth for all TDD frames across several closely located cell sites in order to minimize or eliminate cell-to-cell interference (process step 625). Again, bandwidth is allocated, and TDD transition period 350 is positioned, such that the longest downlink transmission is complete before any receiver in any of the closely located cell sites starts to listen for uplink transmissions. Finally, the downlink portions of the TDD frames are launched simultaneously using the highly accurate clock from the distributed timing architecture (process step 630).

The dynamic application of TDD bandwidth allocation is bounded by set minimum and maximum boundaries set by the service provider, based on traffic and network analysis. Further, the bandwidth bounds may be allocated in sub-groupings based on established quality of service (QoS) requirements (e.g., voice data) and Service Level Agreements (SLA) (e.g., broadband data rate) as the primary consideration and with best efforts, non-QoS data, and IP traffic as secondary considerations. The bandwidth bounds may be allocated based on the fact that a subscriber may support more that one interface and thus more than one modulation format in order to achieve required error rates for one or more services provided to the subscriber.

Figure 7:
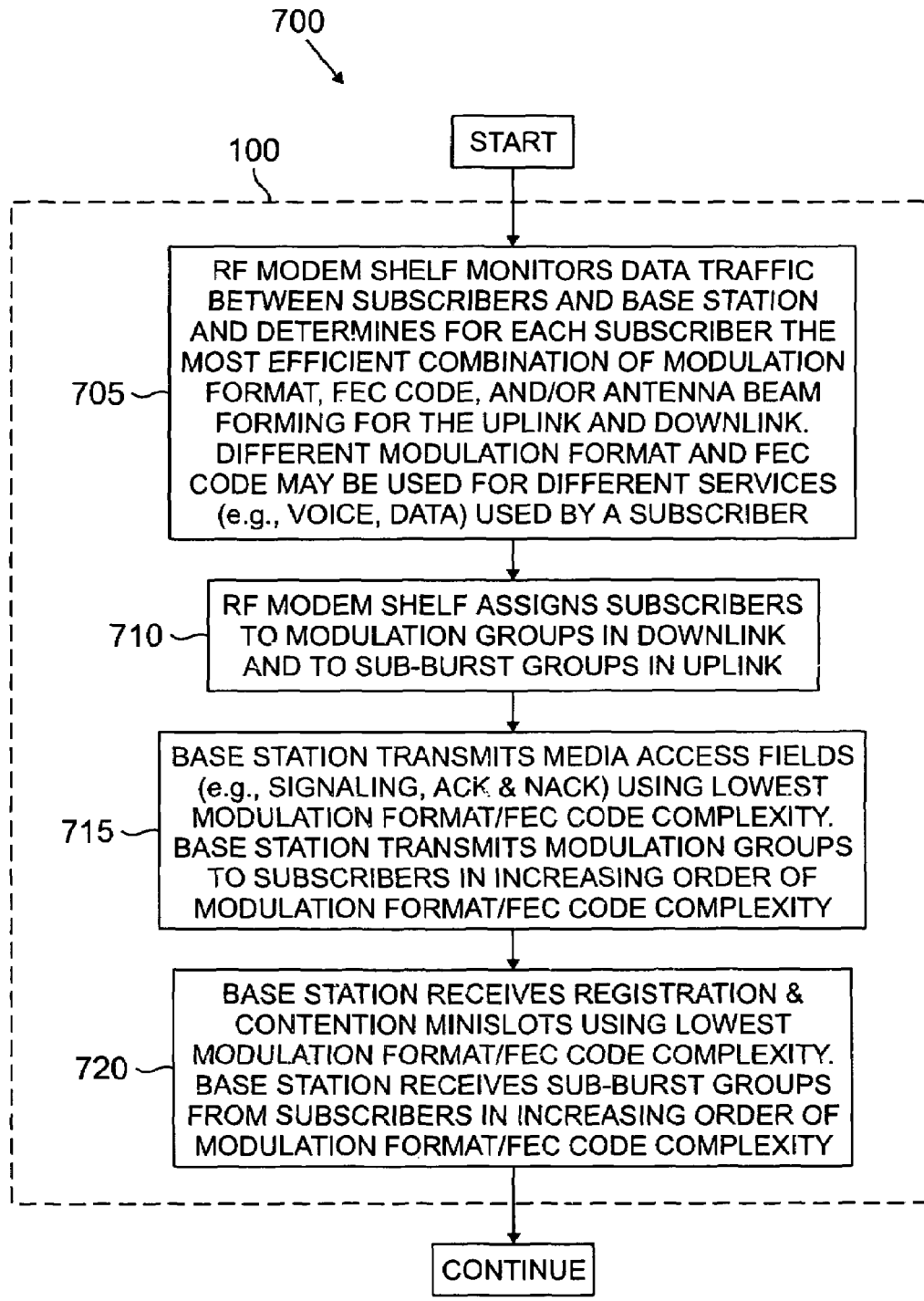
FIG. 7 is a flow diagram illustrating the adaptive assignment of selected link parameters, such as modulation format, forward error correction (FEC) codes, and antenna beam forming, to the uplink and downlink channels used by each subscriber in the exemplary wireless access network according to one embodiment of the present invention.

FIG. 7 depicts flow diagram 700, which illustrates the adaptive assignment of selected link parameters, such as modulation format, forward error correction (FEC) codes, and antenna beam forming, to the uplink and downlink channels used by each subscriber in wireless access network 100 according to one embodiment of the present invention. The RF modem shelf monitors data traffic between subscribers and base station and determines for each subscriber the most efficient combination of modulation format, FEC code, and/or antenna beam forming for the uplink and downlink.

The selected combination is based at least in part on the error rates detected by the RF modem shelf when monitoring the data traffic. If the error rate for a particular subscriber is too high in either the uplink or the downlink, the RF modem shelf can decrease the modulation format complexity and use a higher level of FEC code protection in either the uplink or the downlink in order to reduce the error rate. Conversely, if the error rate for a particular subscriber is very low in either the uplink or the downlink, the RF modem shelf can increase the modulation format complexity and use a lower level of FEC code protection in either the uplink or the downlink in order to increase the spectral efficiency, provided the error rate remains acceptably low. Different modulation formats and FEC codes may be used for different services (e.g., voice, data) used by a subscriber (process step 705).

Next, the RF modem shelf assigns subscribers to modulation groups in the downlink and to sub-burst groups in the uplink (process step 710). The base station transceiver then transmits media access fields (e.g., signaling, ACK & NACK) using the lowest modulation format/FEC code complexity. The base station transceiver then transmits the remaining modulation groups in the downlink to the subscribers in increasing order of modulation format/FEC code complexity (process step 715). When the downlink is complete, the base station transceiver receives registration & contention minislots transmitted by the subscriber access devices using the lowest modulation format/FEC code complexity. The base station transceiver then receives the remaining sub-burst groups transmitted by the subscribers in increasing order of modulation format/FEC code complexity (process step 720).

The use of adaptive link parameters improves the link throughput and correspondingly affects the bandwidth allocation described above in FIG. 6. Link parameters apply not only to the transmitter but to the receiver as well. The present invention uses a bounded (finite) set of modulation formats to maximize bandwidth utilization to each subscriber in a channel or sector. In an exemplary embodiment of the present invention, the low complexity (low bandwidth efficiency) modulation formats used for media access fields (e.g., signaling, ACK, NACK) are binary phase shift keying (BSPK or 2-PSK) and quadrature phase shift keying (QPSK or 4-PSK). The present invention may also use multiple-code orthogonal expansion codes in conjunction with the low complexity modulation formats for extremely robust communication. The higher complexity (higher efficiency) modulation formats used for the modulation groups and the sub-burst groups may be 8-PSK, 16 quadrature amplitude modulation (QAM), 32 QAM, 64 QAM, 128 QAM, and the like.

The present invention also uses bounded set of FEC codes to maximize bandwidth utilization to each subscriber in a channel or sector. The level of FEC code protection is based on the services provided. Each subscriber may support multiple services.

In an advantageous embodiment of the present invention, the RF modem shelf may use packet fragmentation to transport data in either the uplink or the downlink. Fragmentation is the division of larger packets into smaller packets (fragments) combined with an ARQ (automatic request for retransmission) mechanism to retransmit and recover erroneous fragments. The RF modem shelf automatically reduces fragment size for high error rate channels. Fragmentation is applied for guaranteed error-free sources. The degree of fragmentation and ARQ is based on the service provided, since each subscriber may support multiple services.

Figure 8:
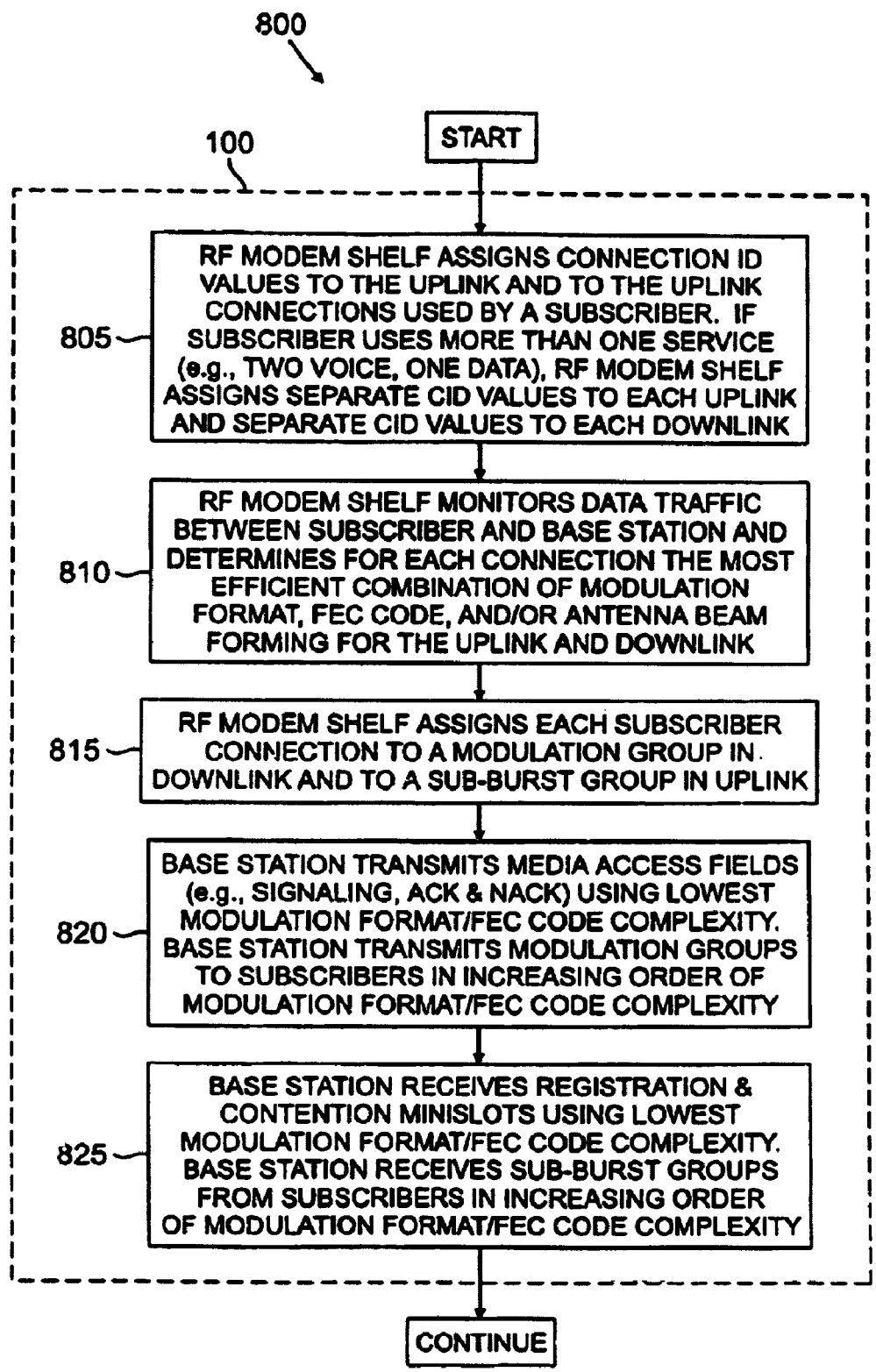
FIG. 8 is a flow diagram illustrating the adaptive assignment of selected link parameters to the different service connections used by each subscriber in the wireless access network according to one embodiment of the present invention.

FIG. 8 depicts flow diagram 800, which illustrates the adaptive assignment of selected link parameters to the different service connections used by each subscriber in wireless access network 100 according to one embodiment of the present invention. The RF modem shelf assigns connection identification (CID) values to the uplink and to the uplink connections used by a subscriber. If a subscriber uses more than one service (e.g., two voice, One data), the RF modem shelf assigns separate CID values to each uplink connection and separate CID values to each downlink connection (process step 805). As noted above, the CID comprises a bit field with the uppermost bits identifying the subscriber and the lowermost bits identifying a specific connection to the subscriber. While many sets of adaptive transmission and reception parameters are possible, there are a finite number of combination that make logical sense. These combinations are grouped into physical layer usage codes that are broadcast to subscribers as part of the general header of TDD superframe or frame header on a periodic basis. These apply to both the base station transmissions and the subscriber transmissions.

The RF modem shelf monitors data traffic between subscriber and base station and determines for each connection the most efficient combination of modulation format, FEC code, and/or antenna beam forming for the uplink and downlink (process step 810). The RF modem shelf then assigns each subscriber connection to a modulation group in the downlink and to a sub-burst group in the uplink (process step 815). The base station transmits media access fields (e.g., signaling, ACK & NACK) using the lowest modulation format/FEC code complexity. Then base station then transmits modulation groups to subscribers in increasing order of modulation format/FEC code complexity (process step 820). Finally, the base station receives registration & contention minislots using the lowest modulation format/FEC code complexity. Then base station then receives sub-burst groups from subscribers in increasing order of modulation format/FEC code complexity (process step 825).

Physical layer usage codes are bound to subscriber CID values by a service establishment protocol. If there is a degradation or improvement in the channel between a subscriber and the base station, a protocol exists so the subscriber access device and the base station may revise the physical layer usage code and subscriber CID code. The codes and bindings can be added and deleted based on services requirements of the subscriber.

The present invention applies beam forming in the transmit and receive paths of wireless access network 100 for a number of reasons, including greatly improved to carrier-to-interference ratio, which allows frequency reuse patterns that require less spectrum, two to four times the amount of spatial reuse using multiple simultaneous beams, and increased cell radius, particularly for the band where the uplink from the subscriber to the base can use higher receive gain to overcome uplink loss problems. The use of advanced antenna technology introduces an additional level of media access control (MAC) complexity.

The MAC layer and physical (PHY) layer have an added spatial/beam component that must be factored into MAC layer coordination of the PHY layer. On a subscriber-by-subscriber basis (i.e., link-by-link basis), the MAC layer and PHY layer must coordinate the following parameters:

1) Communications burst duration
   a) Individual uplink or downlink for TDD system; and
   b) Joint uplink and downlink for FDD system;
2) Modulation complexity;
3) FEC rate; and
4) Beam/combining parameters.

Beam forming and advanced antennas change the basic paradigm that all subscribers have the capability of simultaneously receiving broadcast information from the base station. Transmit and receive beams are formed to optimize communications with a given subscriber with a channel response $H_n(t)$ and beam parameters $B_n(t)$. The base station forms the beam and either sends or receives from the subscribers in an order determined by the MAC layer.

To support advanced antenna systems both FDD and TDD links must be designed to provide transmissions based on self-contained bursts. Conceptually, TDD is easy to understand. A beam is formed for each transmitted burst in either the upstream or the downstream. These simple sequential cases can be expanded to advanced beam forming techniques to provide simultaneous multiple access to spatially independent users. A beam-forming network can create two or more independent beams with low self-interference that allow simultaneous communications using the same frequency. While beam-forming complexity is increased, spectral reuse is also increased. The complexity of PHY layer hardware and MAC layer scheduling software also increase proportionally with the number of beams created. The MAC and PHY also need to perform burst scheduling and transmission based on spatial concatenation. One or more subscribers can be supported by a single set of beam-forming parameters due to close physical proximity.

A beam-forming network is a series of antenna elements combined with a delay-weight network that combines the RF energy of a wave front incident on the antenna elements. This enhances gain in a given direction or steers a null in a specific direction. A beam-forming system consisting of N antenna elements is generally arranged in a line or in a rectangular array. The N element array can theoretically steer N-1 nulls. Beam-forming networks are much less efficient at creating gain patterns for distinct beams.

The array elements are spaced by W/N, where N is an integer value 1, 2, 4, 8, . . . , and W is the wavelength of the signal. Typically, the elements are spaced at W/4. Each of these elements is connected to a circuit that can be programmed with a variable delay and phase to each element. The signal products are summed together to form the final beam (e.g., the ideal constructed beam diagram). Conceptually this is very much like a FIR signal filter. The array coherently sums the wave front components from a given direction by forming a time/phased delay at each element.

Figure 9:
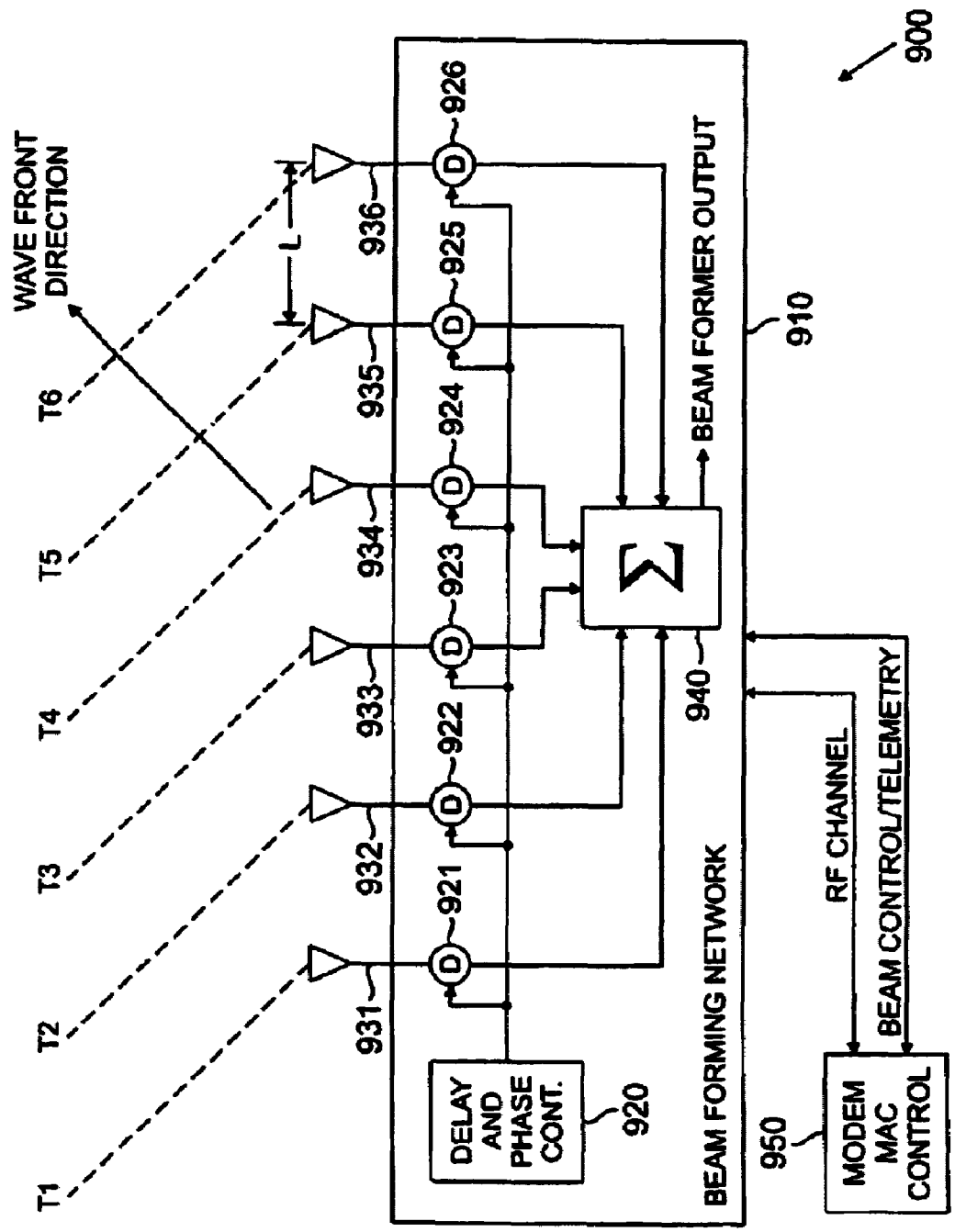
FIG. 9 illustrates selected portions of the receive path of an exemplary conventional analog beam-forming system.

Beam forming can be performed at RF frequencies using analog delay and phase elements or at baseband frequencies using digital techniques. FIG. 9 illustrates selected portions of the receive path of conventional analog beam-forming system 900. Analog beam-forming system 900 comprises beam-forming network 910, antennas 931-936, and modem/MAC layer control block 950. Beam-forming network 910 comprises programmable delay and phase controller 920, delay (D) elements 921-926, and signal combiner 940. An incident wave front is detected by antenna 931 at time T1, by antenna 932 at time T2, by antenna 933 at time T3, by antenna 934 at time T4, by antenna 935 at time T5, and by antenna 936 at time T6.

As FIG. 9 illustrates, the delay of the signal wave at each element for a given angle of signal arrival is given by:

$t=L/c$ where c is the speed of light. The distance, L, between wave fronts to each element is based on the angle of arrival of the signal relative the antenna elements. As an example, if the delay, D, for the antenna elements are all set to be equal, then the antenna has maximum gain at 0 degrees. If the delays are incrementally set from delay element 926 to delay element 921 to have the values 0, W/4c, 2W/4c, 3W/4c, . . . , 5W/4c, then the beam that is formed at the output of signal combiner 940 has maximum gain at 90 degrees (i.e., to the right).

Figure 10:
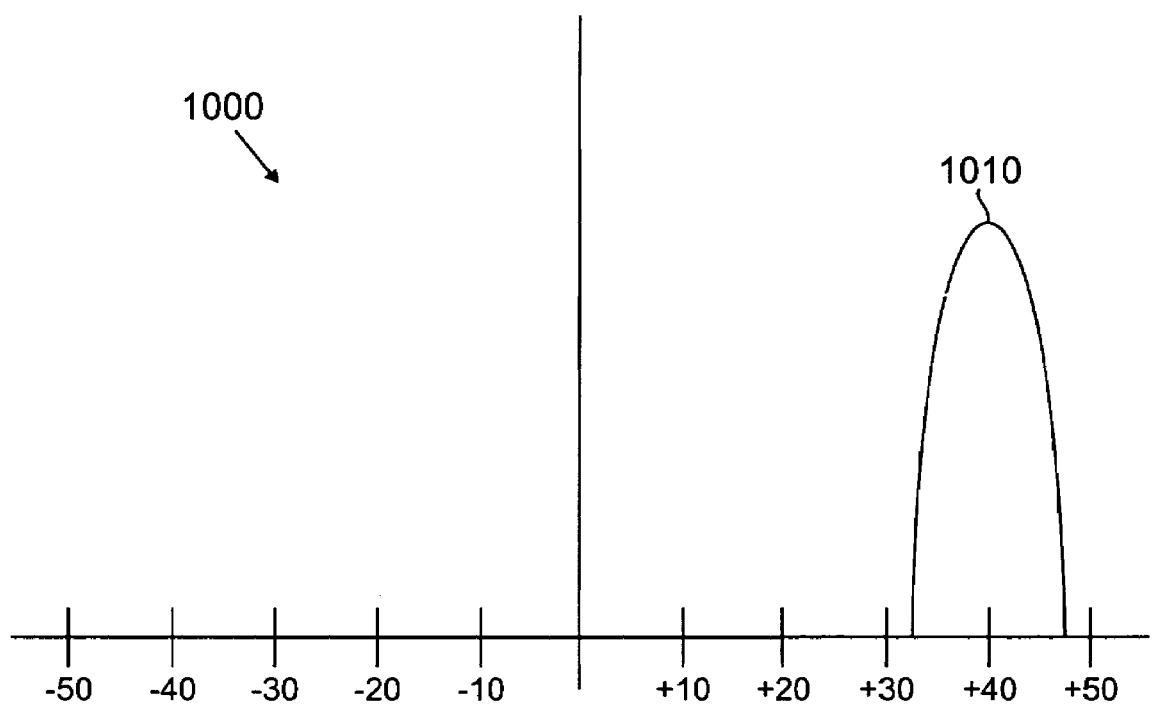
FIG. 10 represents an exemplary spatial response of the receive path of the exemplary analog beam-forming system in FIG. 9.

FIG. 10 represents an exemplary spatial response of the receive path of conventional analog beam-forming system 900. Power lobe 1010 represents the received beam formed by conventional analog beam-forming system 900. The signal gain maximum occurs at an angle of approximately +40 degrees to the right of an arbitrary 0 degree reference in the sector covered by the antennas of conventional analog beam-forming system 900.

Analog beam forming has numerous benefits. Analog beam-forming capabilities can be retrofitted to existing systems by adding telemetry and time coordination. There is a much lower cost relative to the baseband configuration.

Analog beam-forming systems also have excellent back-lobe/front-to-back emission characteristics to meet ETSI TM4 standards. However, analog beam forming systems are limited in the number of simultaneous beams according to the maximum number of RF cables up a tower and RF combiner losses.

Figure 11:
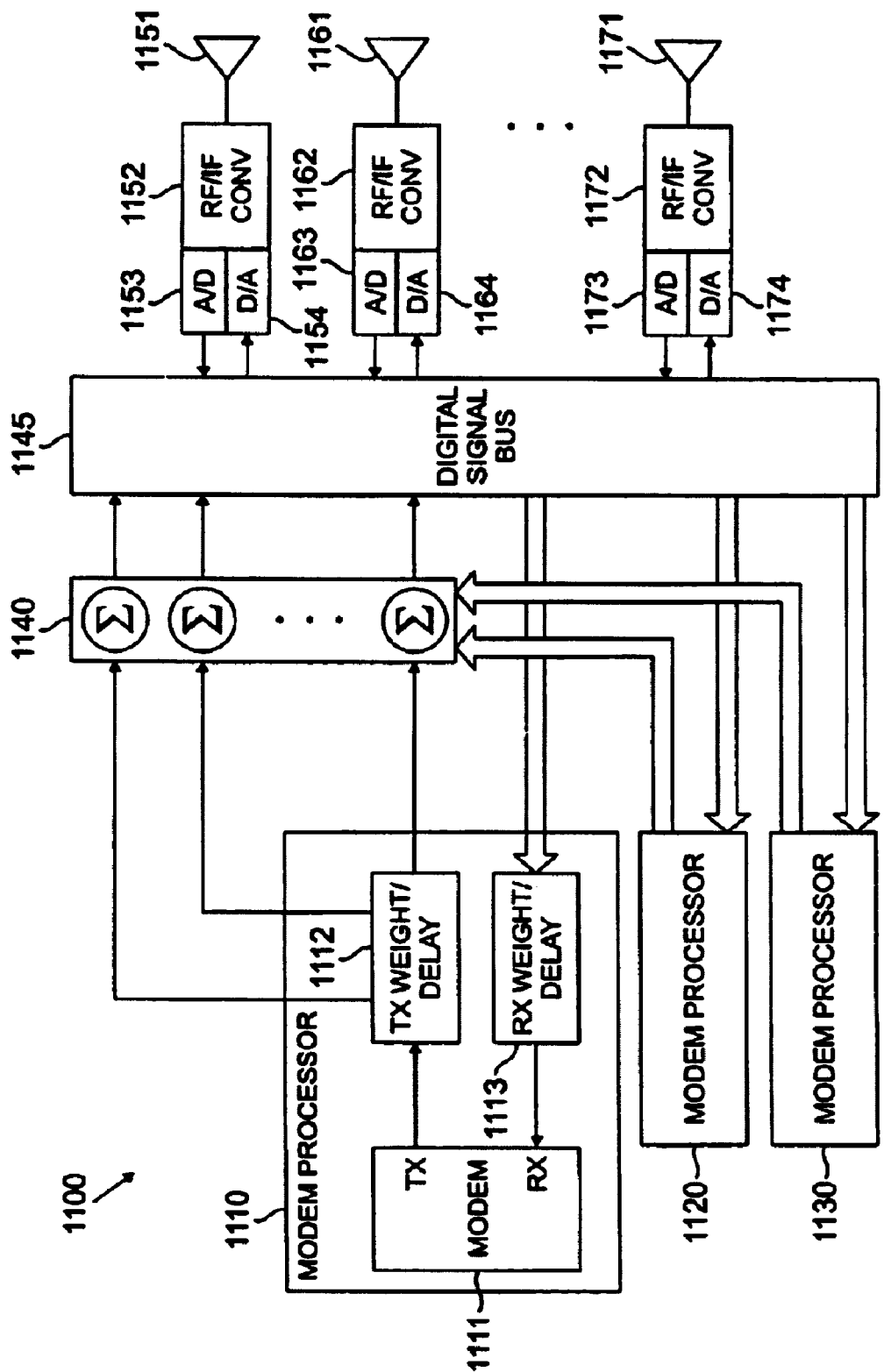
FIG. 11 illustrates selected portions of the transmit path and the receive path of an exemplary conventional digital beam-forming system.

FIG. 11 illustrates selected portions of the transmit path and the receive path of conventional digital beam-forming system 1100. Digital beam-forming system 1100 comprises modem processors 1110, 1120 and 1130, transmit signal combiner 1140, digital signal bus 1145 and a plurality of transceiver front-end elements. Modem processor 1110 is representative of modem processors 1120 and 1130. Modem processor 1110 comprises modem 1111, programmable transmitter (TX) weight/delay controller 1112, and programmable receiver (RX) weight/delay controller 1113.

Three exemplary transceiver front-end elements are illustrated. A first transceiver front-end element comprises antenna 1151, radio frequency/intermediate frequency (RF/IF) converter 1152, analog-to-digital converter (ADC) 1153, and digital-to-analog (DAC) 1154. A second transceiver front-end element comprises antenna 1161, radio frequency/intermediate frequency (RF/IF) converter 1162, analog-to-digital converter (ADC) 1163, and digital-to-analog (DAC) 1164. Finally, the first transceiver front-end element comprises antenna 1171, radio frequency/intermediate frequency (RF/IF) converter 1172, analog-to-digital converter (ADC) 1173, and digital-to-analog (DAC) 1174.

As FIG. 11 illustrates, each antenna has a RF/IF down-converter and up-converter (i.e., RF/IF converters 1152, 1162, and 1172), an A/D converter, and a D/A converter. The receive path signals are distributed on high-speed digital signal bus 1145 to be processed by programmable RX weight/delay controller 1113 and modem 1110 in each baseband modem processor 1110. The transmit path differs slightly from the receive path. Programmable TX weight/delay controller 1112 performs the delay and phase adjustments to the signal to be feed to each antenna element. Then, transmit signal combiner 1140 (generally an individual card) sums the transmit signals from the multiple simultaneous channels if more than one channel is to be transmitted. This summed signal is presented to the RF/IF converter for each antenna.

Digital baseband beam forming has the numerous benefits. Digital baseband beam-forming systems provide the most flexible configuration and provide all antenna data to the receiver circuits to allow for rapid calculation of adaptive cancellation. Digital baseband beam-forming systems also provide all-digital processing of weights and delay values and reduce the size of the RF amplifier. However, digital baseband beam-forming systems have a very high up-front cost. To limit costs, sparse arrays (as opposed to array panel configurations) are sometimes used, which causes beam pattern back-lobe problems and sometimes results in failure to consistently meet ETSI TM4 (i.e., cell-to-cell interference) standards. Also, critical tower loading is still a problem. High performance (large number of antenna element) configurations must have full demodulation and electro-optic interfaces at the tower.

The present invention uses a combination of the following techniques to maximize frequency re-use and the number of subscribers per base station in wireless access network 100:

1) beam scanning within a cell sector; and 2) spread spectrum transmission to allow down-link broadcast of synchronization and beam maps for the MAC layer with a cell sector.

Figure 12A:
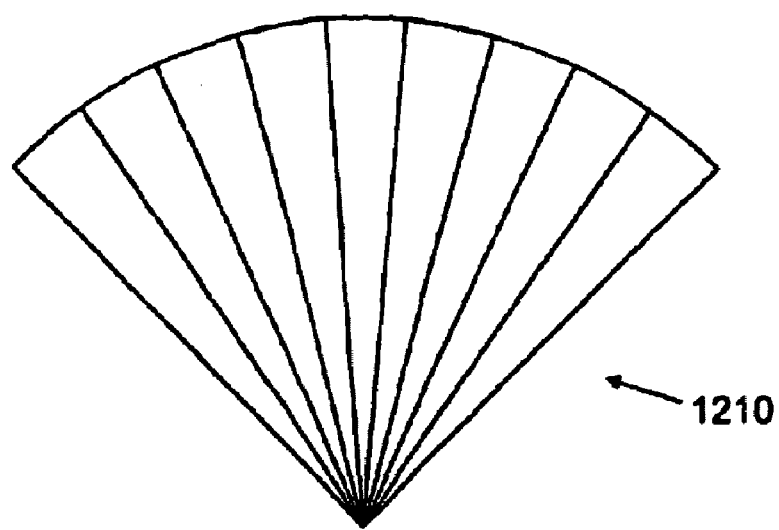
FIG. 12A illustrates an exemplary beam scanning pattern according to one embodiment of the present invention.

The present invention uses pre-programmed sets of directed beam patterns to cover a cell in an angular fashion. This is referred to herein as "beam scanning". FIG. 12A illustrates exemplary beam scanning pattern 1210 according to one embodiment of the present invention. Beam scanning pattern 1210 covers an cell sector that is approximately 90 degrees wide. Beam scanning patter 1210 is covered by nine directed scanning beams, each approximately 10 degrees wide. The base station establishes a set of beams to cover the cell. Based on physical location in the sector, a specific beam is used to communicate with one or more subscribers that lie in that sector. The nine scanning beams may be transmitted or received in any order.

Figure 12B:
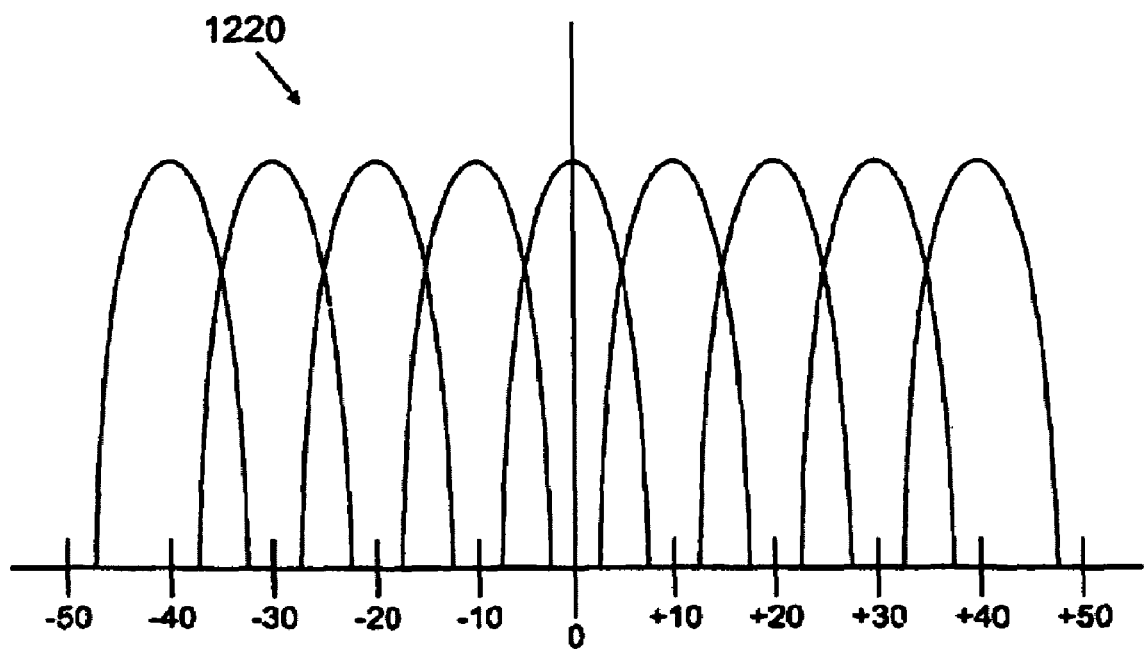
FIG. 12B represents the spatial response of the transmit and receive scanning beams in the exemplary beam scanning pattern in FIG. 12A.

FIG. 12B represents exemplary spatial response 1220 of the transmit and receive scanning beams in beam scanning pattern 1210. Nine signal gain maximums occur, one for each scanning beam. The leftmost signal gain maximum is formed at an angle of approximately −40 degrees to the left of an arbitrary 0 degree reference in the sector. The rightmost signal gain maximum is formed at an angle of approximately +40 degrees to the right of an arbitrary 0 degree reference in the sector. The nine signal gain maximums are spaced 10 degrees apart.

An important issue when using a spatial/beam component in wireless access network 100 is subscriber acquisition and maintaining system synchronization. If wireless access network 100 could guarantee equal distribution of subscribers into the sector beam set, a simple round robin polling method could be used. However, uniform distribution is not guaranteed and wireless access network 100 may use a large number of beams to cover a sector. The revisit time to any specific beam may result in subscribers falling out of synchronization.

Figure 13A:
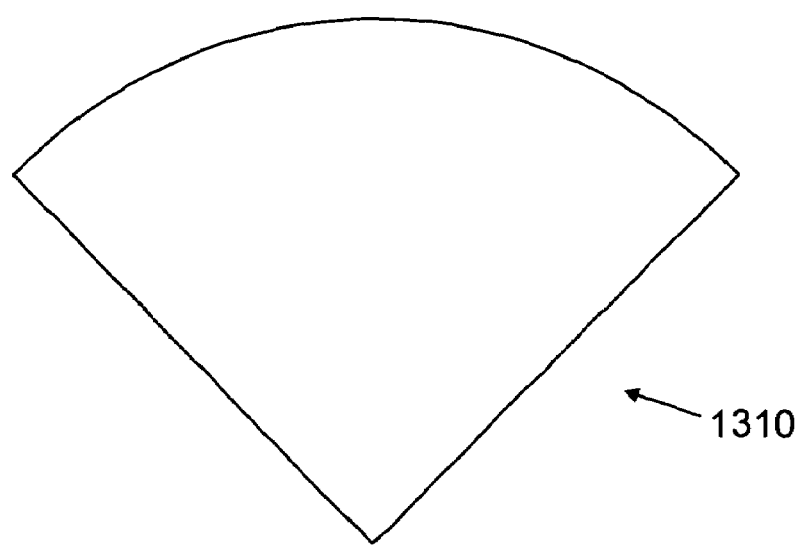
FIG. 13A illustrates an exemplary broadcast pattern according to one embodiment of the present invention.
Figure 13B:
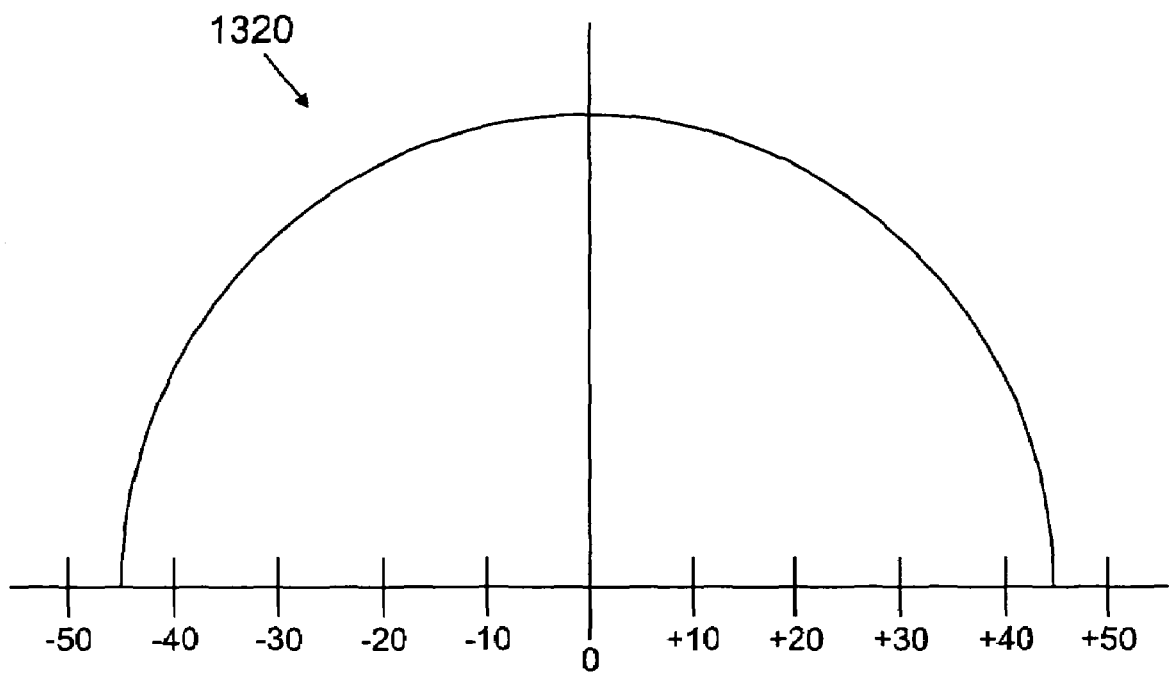
FIG. 13B represents the spatial response of the broadcast beam in FIG. 13A.

One alternative to a guaranteed minimum revisit time is to have a full-sector coverage broadcast beam and use of spread spectrum processing gain in the air interface. The broadcast beam is shown in FIGS. 13A and 13B. FIG. 13A illustrates exemplary broadcast pattern 1310 according to one embodiment of the present invention. Broadcast pattern 1310 covers all of the 90 degree cell sector in FIG. 12A. FIG. 13B represents exemplary spatial response 1320 of the broadcast beam. The broadcast beam covers the 90 degree sector fairly uniformly.

By introducing spread spectrum and a broadcast beam operating on the Start of Frame (SOF) field of every frame, the present invention provides improved performance for acquisition and synchronization as opposed to either equal duration round robin polling per scan beam or dynamic weighted polling per scan beam based on the throughput per cell.

The key elements for the air interface are:

1) subscriber receiver (RX) acquisition and synchronization;

2) transmitter (TX) acquisition and ranging;

3) map information for beam scheduling and up/down link maps for a given frame; and 4) demand access mechanisms.

According to an advantageous embodiment of the present invention, the air interface is implemented using a TDD frame format. According to one embodiment, beam switching occurs on a frame-by-frame basis so that for a complete TDD frame, only one beam is active. However, in alternate embodiments of the present invention, more than one beam may be used in each TDD frame, particularly in the down-link due to typical 4:1 asymmetry. The uplink may be limited to a single scanning beam per frame.

Figure 14:
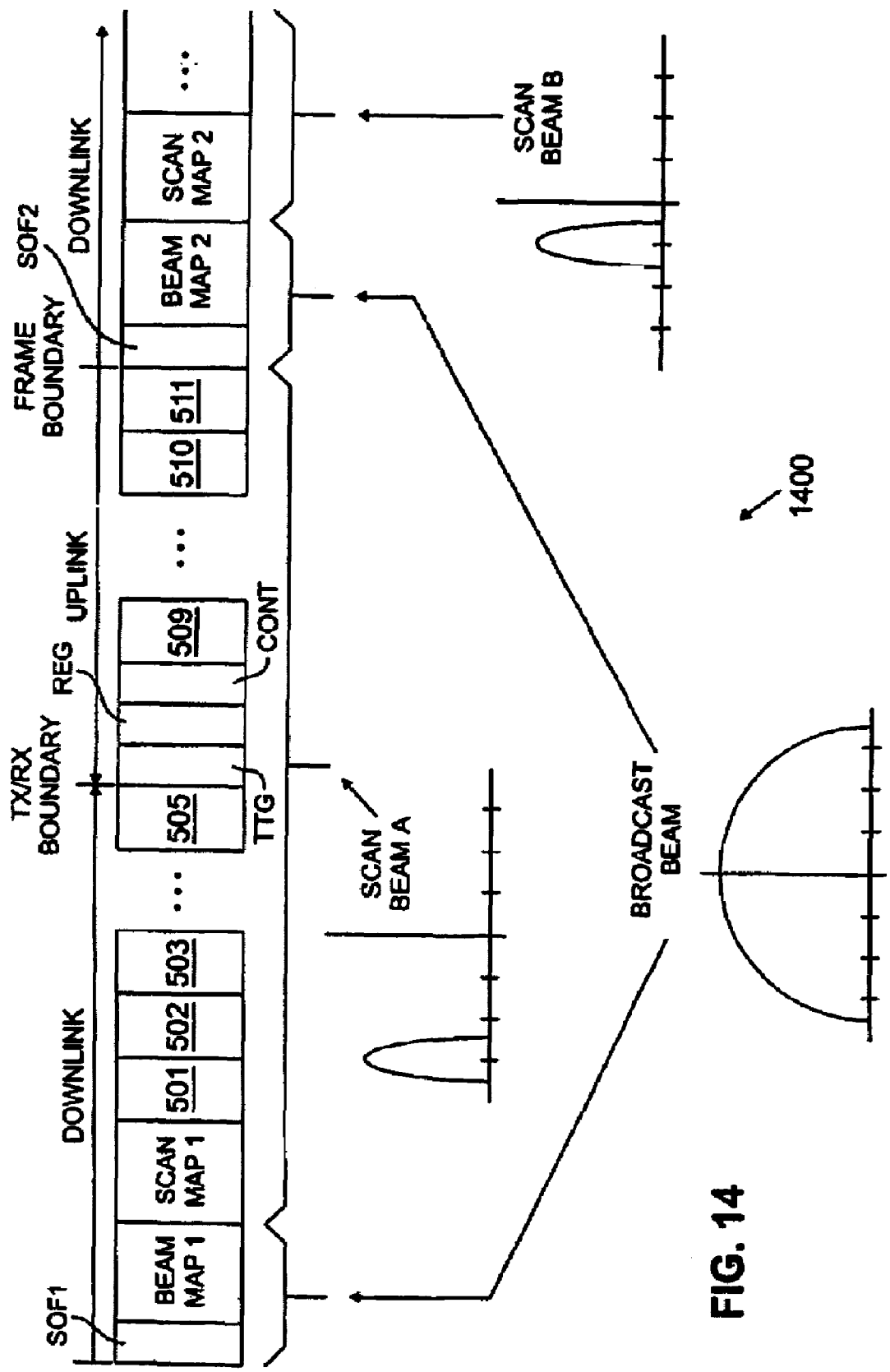
FIG. 14 illustrates the use of broadcast beams and scanning beams in exemplary time division duplex (TDD) frames according to one embodiment of the present invention.

To implement the added complexity of switched beam access, the exemplary TDD frame in FIG. 14 may be used. FIG. 14 illustrates the use of broadcast beams and scanning beams in exemplary time division duplex (TDD) signal 1400 according to one embodiment of the present invention. In FIG. 14, single beam per frame mode is depicted.

TDD signal 1400 comprises a first TDD frame having a downlink portion comprising a first start-of-frame field (SOF1), a first beam map field (Beam Map 1), and a first scan map field (Scan Map 1). The remainder of the downlink portion comprises preamble field 501, management field 502, and N modulation groups, including exemplary modulation groups 503 and 505, which were described above in greater detail in FIG. 5. The first TDD frame also has an uplink portion comprising a transmitter-transmitter guard (TTG) slot, a plurality of registration (REG) minislots, a plurality of contention (CON) request minislots, and N sub-burst groups, including sub-burst groups 509 and 510, and receiver-transmitter guard (RTG) slot 511, which were described above in greater detail in FIG. 5.

The first TDD frame is followed by a second TDD frame in which portions of the downlink are shown. The second TDD frame comprises a second start-of-frame field (SOF2), a second beam map field (Beam Map 2), and a second scan map field (Scan Map 2).

According to one embodiment of the present invention, an exemplary spread spectrum Broadcast Beam is used to transmit the start-of-frame fields (SOF1 and SOF2) and the beam map fields (Beam Map 1 and Beam Map 2) in each TDD frame, and distinct scan beams (i.e., Scan Beam A and Scan Beam B) are used to transmit the scan map fields (Scan Map 1 and Scan Map 2) and the remainder of the uplink and downlink portions of each TDD frame.

The Broadcast Beam Maps provide data indicating which scanning beam (or beams) are used at which time (measured in symbols or other baud-oriented time unit) for the frame. For each scanning beam used, an uplink map and a downlink map must be provided. The Scanning Beam Map provides the Uplink and downlink maps. The Scanning Beam Map states at which time in the frame, using the scanning beam described in the Broadcast Beam Map, the downlink modulation groups and specific uplink slots with associated CIDs are allocated for the frame using the specific scanning beam.

According to an exemplary embodiment, the Broadcast Beam uses DSSS spectrum spreading to make up antenna gain loss and transmits as few fields and frame information as possible to maintain efficiency. The Broadcast Beam transmits the SOF synchronization field so that all subscribers, even those that are not actively communicating (i.e., idle subscribers) can maintain synchronization.

Beam Map 1 and Beam Map 2 comprise a Frame Beam Map and Super-Frame Beam Map containing information that defines scanning beams that cover the sector, the adjoining sectors of the same base station, and the sectors of adjoining base stations. The Frame Beam Map defines the number of downlink beams in the remainder of the current frame and lists a beam number and frame time (physical slot) in which each beam starts. The Frame Beam Map also defines the Uplink beam numbers for each subscriber. The Super-Frame Beam Map defines the number of beams in the relevant sector.

Scan Beams A and B provides 802.16 MAP/MAC and standard packet communications using standard modulation formats. The remainder of the TDD frame is processed using the Uplink/Downlink Map information provided by the Broadcast Beam. In such an embodiment, the Broadcast Beam and the associated Super-Frame and Frame Beam Maps inform all subscriber wireless access devices which beams are used. Once the scanning beam is activated, communications are limited to the subscribers associated with that beam.

As note above, the Scanning Beam Map used in the scanning beams are downlink maps and uplink maps. The downlink map indicates the modulation format and forward error correction code (FEC) and time slots enabled on the downlink (i.e., modulation group). The uplink map indicates the specific subscriber, modulation format, FEC, and equalizer (cyclo-stationary processing) for the allowed uplink data bursts.

The acquisition steps are as follows:

1) SOF and Beam Map fields allow initial acquisition identical to a conventional single beam system, including coarse and fine frame alignment, baud and frequency NCO lock, and equalizer initialization;

2) access equipment at the subscriber premises creates a histogram of received signal strength and quality on a per beam basis;

3) subscriber access equipment selects the best scan beam based on the histogram data; and 4) uplink acquisition and ranging initiated by subscriber on the best scan beam.

Although the present invention has been described in detail, those skilled in the art should understand that they can make various changes, substitutions and alterations herein without departing from the spirit and scope of the invention in its broadest form.

What is claimed is:

1. For use in a wireless access network comprising a plurality of base stations, each of said plurality of base stations capable of bidirectional time division duplex (TDD) communication with wireless access devices disposed at a plurality of subscriber premises in an associated cell site of said wireless access network, a transceiver associated with a first of said plurality of base stations comprising:

transmit path circuitry associated with a beam forming network capable of transmitting directed scanning beam signals each directed to substantially only wireless access devices within a different one of a plurality of sectors of a cell site associated with said first base station, wherein said transmit path circuitry transmits, at a start of a TDD frame, a broadcast beam signal to wireless access devices within more than one of said sectors, the broadcast beam signal comprising a start of frame field, and subsequently transmits, in a downlink portion of said TDD frame, first downlink data traffic to substantially only wireless access devices within one of said sectors using one of said directed scanning beam signals.

2. The transceiver as set forth in claim 1 wherein said broadcast beam signal further comprises a first beam map containing scanning beam information usable by said wireless access devices to detect said directed scanning beam signals.

3. The transceiver as set forth in claim 2 wherein said scanning beam information identifies a downlink time slot in said downlink portion during which said one of said directed scanning beam signals transmits said downlink data traffic.

4. The transceiver as set forth in claim 3 wherein said scanning beam information identifies at least one modulation format associated with said one of said directed scanning beam signals.

5. The transceiver as set forth in claim 3 wherein said scanning beam information identifies at least one forward error correction code level associated with said one of said directed scanning beam signals.

6. The transceiver as set forth in claim 2 further comprising receive path circuitry associated with said beam forming network capable of receiving uplink data traffic transmitted by at least one wireless access device in an uplink portion of said TDD frame.

7. The transceiver as set forth in claim 6 wherein said first beam map further contains uplink transmission information identifying an uplink time slot in said uplink portion during which said at least one wireless access device transmits said uplink data traffic.

8. The transceiver as set forth in claim 7 wherein said uplink transmission information further identifies at least one modulation format used by said at least one wireless access device to transmit said uplink data traffic.

9. The transceiver as set forth in claim 8 wherein said uplink transmission information further identifies at least one at least one forward error correction code level used by said at least one wireless access device to transmit said uplink data traffic.

10. A fixed wireless access network comprising:
a plurality of base stations, each of said base stations capable of bidirectional time division duplex (TDD) communication with wireless access devices disposed at a plurality of subscriber premises in a cell site associated with said each base station, wherein said each base station comprises:
transmit path circuitry associated with a beam forming network capable of transmitting directed scanning beam signals each directed to substantially only wireless access devices within a different one of a plurality of sectors of a cell site associated with said first base station, wherein said transmit path circuitry transmits, at a start of a TDD frame, a broadcast beam signal to wireless access devices within more than one of said sectors, the broadcast beam signal comprising a start of frame field, and subsequently transmits, in a downlink portion of said TDD frame, first downlink data traffic to substantially only wireless access devices within one of said sectors using one of said directed scanning beam signals.

11. The fixed wireless access network as set forth in claim 10 wherein said broadcast beam signal further comprises a first beam map containing scanning beam information usable by said wireless access devices to detect said directed scanning beam signals.

12. The fixed wireless access network as set forth in claim 11 wherein said scanning beam information identifies a downlink time slot in said downlink portion during which said one of said directed scanning beam signals transmits said downlink data traffic.

13. The fixed wireless access network as set forth in claim 12 wherein said scanning beam information identifies at least one modulation format associated with said one of said directed scanning beam signals.

14. The fixed wireless access network as set forth in claim 12 wherein said scanning beam information identifies at least one forward error correction code level associated with said one of said directed scanning beam signals.

15. The fixed wireless access network as set forth in claim 11 wherein said each base station further comprises receive path circuitry associated with said beam forming network capable of receiving uplink data traffic transmitted by at least one wireless access device in an uplink portion of said TDD frame.

16. The fixed wireless access network as set forth in claim 15 wherein said first beam map further contains uplink transmission information identifying an uplink time slot in said uplink portion during which said at least one wireless access device transmits said uplink data traffic.

17. The fixed wireless access network as set forth in claim 16 wherein said uplink transmission information further identifies at least one modulation format used by said at least one wireless access device to transmit said uplink data traffic.

18. The fixed wireless access network as set forth in claim 17 wherein said uplink transmission information further identifies at least one at least one forward error correction code level used by said at least one wireless access device to transmit said uplink data traffic.

19. For use in a wireless access network comprising a plurality of base stations, each of said plurality of base stations capable of bidirectional time division duplex (TDD) communication with wireless access devices disposed at a plurality of subscriber premises in an associated cell site of said wireless access network, a method of communicating with a first of said plurality of base stations comprising the steps of:
transmitting, at a start of a TDD frame, a broadcast beam signal to wireless access devices within more than one of a plurality of sectors within said associated cell site, the broadcast beam signal comprising a start of frame field capable of synchronizing receivers in said wireless access devices; and
transmitting, in a downlink portion of said TDD frame, first downlink data traffic to substantially only wireless access devices in a first of said sectors using a first directed scanning beam signal.

20. The method as set forth in claim 19 wherein said broadcast beam signal further comprises a first beam map containing scanning beam information usable by said wireless access devices to receive said first directed scanning beam signal.

21. The method as set forth in claim 20 wherein said scanning beam information identifies a downlink time slot in said downlink portion during which said first directed scanning beam signal transmits said downlink data traffic.

22. The method as set forth in claim 21 wherein said scanning beam information identifies at least one modulation format associated with said first directed scanning beam signal.

23. The method as set forth in claim 21 wherein said scanning beam information identifies at least one forward error correction code level associated with said directed scanning beam signal.

24. The method as set forth in claim 20 further the step of receiving uplink data traffic transmitted by at least one wireless access device in an uplink portion of said TDD frame.

25. The method as set forth in claim 24 wherein said first beam map further contains uplink transmission information identifying an uplink time slot in said uplink portion during which said at least one wireless access device transmits said uplink data traffic.

26. The method as set forth in claim 25 wherein said uplink transmission information further identifies at least one modulation format used by said at least one wireless access device to transmit said uplink data traffic.

27. The method as set forth in claim 26 wherein said uplink transmission information further identifies at least one at least one forward error correction code level used by said at least one wireless access device to transmit said uplink data traffic.

28. The transceiver as set forth in claim 1 wherein said transmit path circuitry transmits, in said downlink portion of said TDD frame, second downlink data traffic to substantially only wireless access devices within an other of said sectors using an other of said directed scanning beam signals.

29. The method as set forth in claim 19, further comprising:

transmitting, in said downlink portion of said TDD frame, second downlink data traffic to substantially only wireless access devices in a second of said sectors using a second directed scanning beam signal.

* * * * *